(12) United States Patent  (10) Patent No.: US 7,096,549 B2
Coffield  (45) Date of Patent: Aug. 29, 2006

(54) CARRIER AND ATTACHMENT METHOD FOR LOAD-BEARING FABRIC

(75) Inventor: Timothy P. Coffield, Grand Rapids, MI (US)

(73) Assignee: Dahti, Inc., Grand Rapids, MI (US)

( * ) Notice: Subject to any disclaimer, the term of this patent is extended or adjusted under 35 U.S.C. 154(b) by 0 days.

(21) Appl. No.: 11/128,801

(22) Filed: May 13, 2005

(65) Prior Publication Data

US 2005/0206210 A1    Sep. 22, 2005

Related U.S. Application Data

(60) Division of application No. 10/382,792, filed on Mar. 6, 2003, now Pat. No. 6,899,398, which is a continuation-in-part of application No. 10/342,602, filed on Jan. 15, 2003, now Pat. No. 6,966,606, which is a division of application No. 09/666,624, filed on Sep. 20, 2000, now Pat. No. 6,540,950.

(51) Int. Cl.
 *B68G 7/00* (2006.01)
 *A47C 31/02* (2006.01)

(52) U.S. Cl. .............................. 29/91.5; 29/91; 29/91.1; 29/450; 29/453; 297/218.5

(58) Field of Classification Search .................. 29/446, 29/448, 450, 453, 235, 91.1, 91.5, 91; 297/218.5
See application file for complete search history.

(56) References Cited

U.S. PATENT DOCUMENTS

| 265,302 | A | 10/1882 | Brigham |
| 614,235 | A | 11/1898 | Palmer |
| 662,647 | A | 11/1900 | Howe |
| 1,120,686 | A | 12/1914 | Burrowes |
| 1,698,065 | A | 1/1929 | Otto |
| 1,711,670 | A | 5/1929 | Brennan |
| 2,156,664 | A | 5/1939 | Little |
| 2,374,801 | A | 5/1945 | Bolick, Sr. |
| 2,856,990 | A | 10/1958 | Thomas |
| 3,041,109 | A | 6/1962 | Eames et al. |
| 3,061,374 | A | 10/1962 | Grosfillex |

(Continued)

FOREIGN PATENT DOCUMENTS

CA    653100    11/1962

(Continued)

OTHER PUBLICATIONS

Ultraflex Corporation; Ultraflex Elastic Webbing for Residential and Commercial Seating; product brochure, 1998.

(Continued)

*Primary Examiner*—Eric Compton
(74) *Attorney, Agent, or Firm*—Warner Norcross & Judd LLP

(57) ABSTRACT

An attachment structure for a load-bearing fabric including an expandable carrier secured to an un-stretched load-bearing fabric. To attach the carrier to a support frame, the carrier and fabric are stretched together to desired shape and secured to the frame. An indexing system registers the carrier and frame and optionally stretches the fabric a predetermined amount. The present invention also provides a lip that flexes in one direction and maintains the fabric in a stretched condition in another. A tool that joins the carrier and frame generally includes a drive roller and a primary roller adapted to move toward one another and join a carrier and the support frame disposed therebetween. The tool may include alignment rollers near the primary and drive rollers to track along and align the carrier and frame.

6 Claims, 20 Drawing Sheets

U.S. PATENT DOCUMENTS

| | | | |
|---|---|---|---|
| 3,165,359 A | 1/1965 | Ashkouti | |
| 3,175,269 A | 3/1965 | Raduns et al. | |
| 3,179,469 A | 4/1965 | Heuston | |
| 3,208,085 A | 9/1965 | Grimshaw | |
| 3,214,314 A | 10/1965 | Rowbottam | |
| 3,298,743 A | 1/1967 | Albinson et al. | |
| 3,375,861 A | 4/1968 | Marlow | |
| 3,438,099 A | 4/1969 | Green | |
| 3,498,668 A | 3/1970 | Vanderminden | |
| 3,601,446 A | 8/1971 | Horby | |
| 3,640,576 A | 2/1972 | Morrison et al. | |
| 3,844,612 A | 10/1974 | Borggren et al. | |
| 3,999,802 A | 12/1976 | Powers | |
| 4,062,590 A | 12/1977 | Polsky et al. | |
| 4,299,645 A | 11/1981 | Newsom | |
| 4,304,436 A | 12/1981 | Rowland | |
| 4,435,882 A | 3/1984 | Unger | |
| 4,456,301 A | 6/1984 | Apissomian | |
| 4,458,943 A | 7/1984 | Krakauer | |
| 4,471,526 A * | 9/1984 | Zaltsberg | 29/745 |
| 4,472,862 A | 9/1984 | Bloomfield et al. | |
| 4,492,408 A | 1/1985 | Lohr | |
| 4,522,444 A | 6/1985 | Pollock | |
| 4,558,904 A | 12/1985 | Schultz | |
| 4,578,851 A * | 4/1986 | Song | 29/235 |
| 4,603,907 A | 8/1986 | Witzki | |
| 4,670,072 A | 6/1987 | Pastor et al. | |
| 4,697,847 A | 10/1987 | Herschlag | |
| 4,796,955 A | 1/1989 | Williams | |
| 4,815,499 A | 3/1989 | Johnson | |
| 4,826,249 A | 5/1989 | Bradbury | |
| 4,842,257 A | 6/1989 | Abu-Isa et al. | |
| 4,928,334 A | 5/1990 | Kita | |
| 4,939,183 A | 7/1990 | Abu-Isa et al. | |
| 4,946,224 A | 8/1990 | Leib | |
| 5,009,827 A | 4/1991 | Abu-Isa et al. | |
| 5,013,089 A | 5/1991 | Abu-Isa et al. | |
| 5,015,034 A * | 5/1991 | Kindig et al. | 297/227 |
| 5,127,143 A * | 7/1992 | Urlacher | 29/235 |
| 5,127,707 A | 7/1992 | Forcolini | |
| 5,176,860 A | 1/1993 | Storch | |
| 5,178,815 A | 1/1993 | Yokote et al. | |
| 5,288,136 A | 2/1994 | Webber et al. | |
| 5,318,348 A | 6/1994 | Hess | |
| 5,503,455 A | 4/1996 | Yang | |
| 5,662,383 A | 9/1997 | Hand | |
| 6,059,368 A | 5/2000 | Stumpf et al. | |
| 6,254,190 B1 * | 7/2001 | Gregory | 297/452.1 |
| 6,311,378 B1 * | 11/2001 | Menguc | 29/235 |
| 6,378,944 B1 | 4/2002 | Weisser | |
| 6,494,540 B1 | 12/2002 | Tornero | |
| 6,523,242 B1 * | 2/2003 | Armellini et al. | 29/451 |
| 6,612,648 B1 * | 9/2003 | Hashiguchi | 297/218.1 |
| 6,842,959 B1 * | 1/2005 | Coffield et al. | 29/449 |
| 6,868,595 B1 * | 3/2005 | Cycholl | 29/235 |
| 6,899,398 B1 * | 5/2005 | Coffield | 297/452.56 |
| 6,942,300 B1 * | 9/2005 | Numa et al. | 297/452.56 |
| 2003/0056464 A1 | 3/2003 | Romes | |
| 2003/0168901 A1 * | 9/2003 | Wilkerson et al. | 297/452.56 |

FOREIGN PATENT DOCUMENTS

| | | |
|---|---|---|
| EP | 1033098 | 9/2000 |
| EP | 1080790 | 3/2001 |
| GB | 669011 | 3/1952 |
| GB | 918743 | 2/1963 |
| GB | 1222908 A2 | 2/1971 |
| SU | 1065262 | 1/1984 |

OTHER PUBLICATIONS

Rockler Companies, Inc.; Metal Ends, The Woodworkers' Store 1990, p. 41004.

Rockler Companies, Inc.; Texweb; The Woodworkers' Store 1993, p. 40998.

One in Vermillion; Dymetrol Seating Support Systems, Plastic Extrusion Attachment Information, http://www.oneinvermillion.com/seating_systems.htm.

One in Vermillion; Metal Frame Installation Techniques; http://www.oneinvermillion.com/metal_frame.htm.

Photographs of Optiride sample attached as Exhibit A.

* cited by examiner

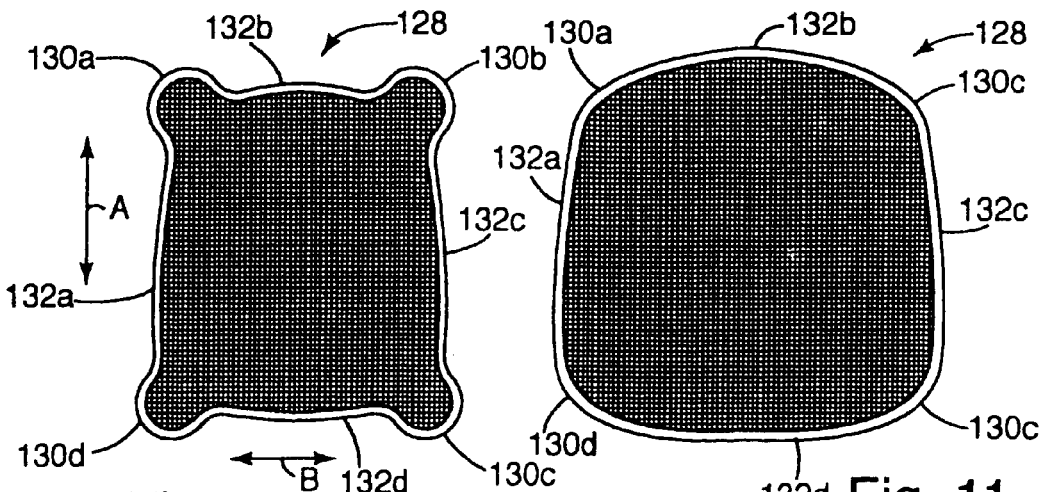
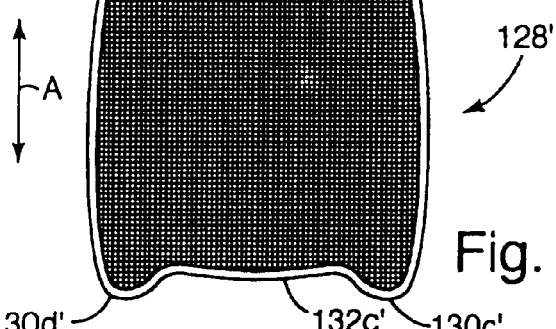
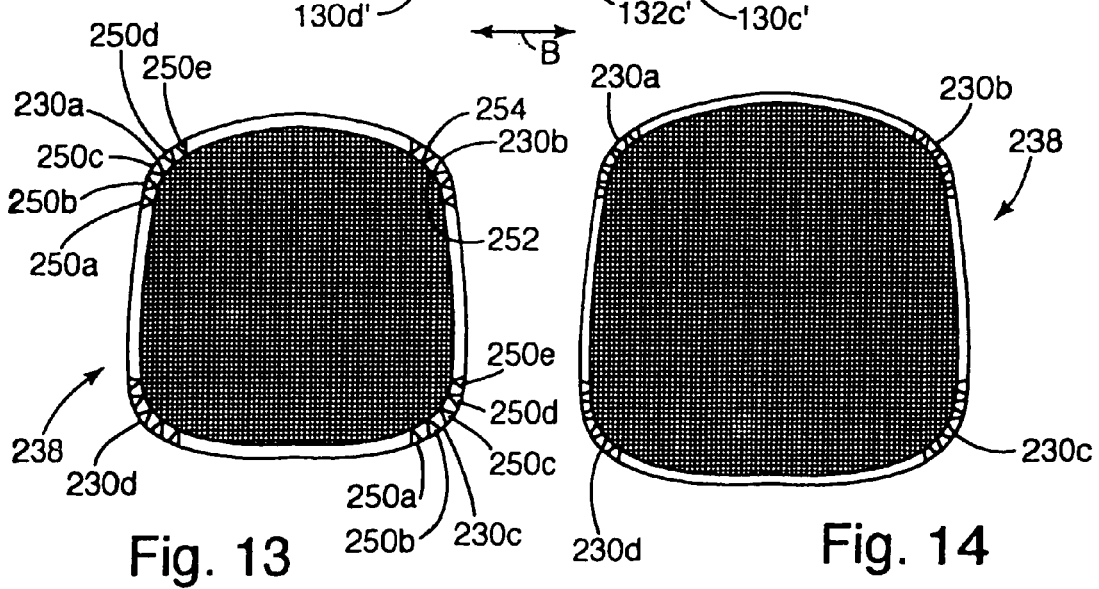

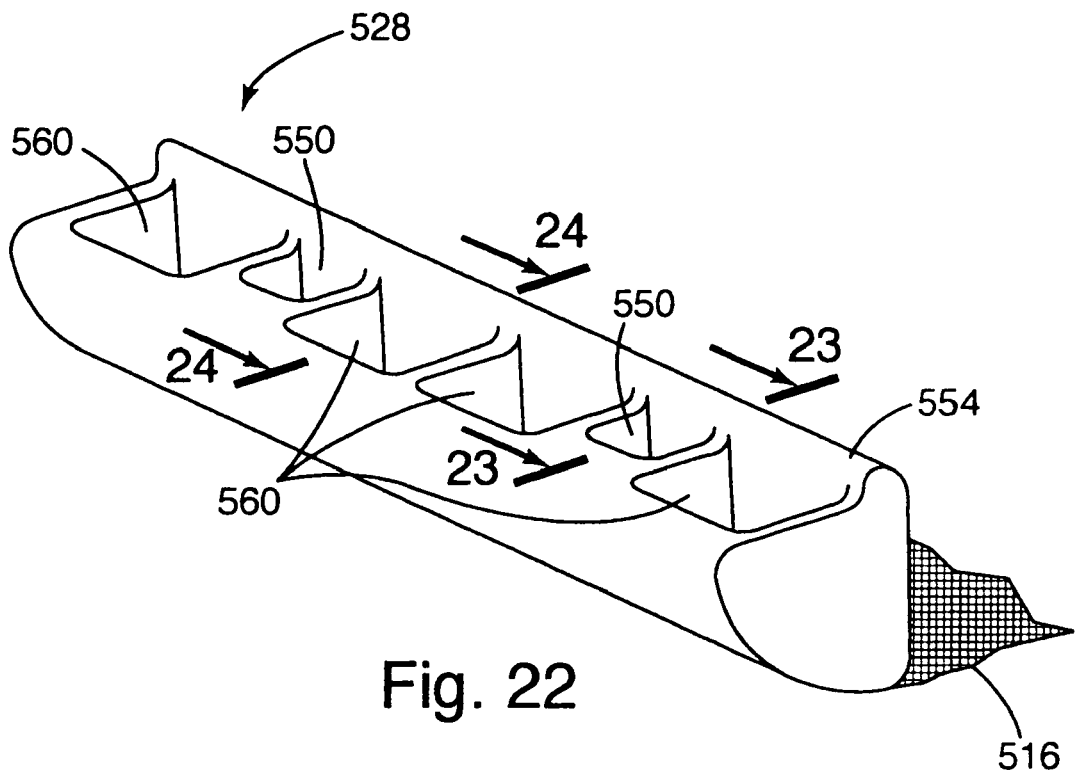
Fig. 22
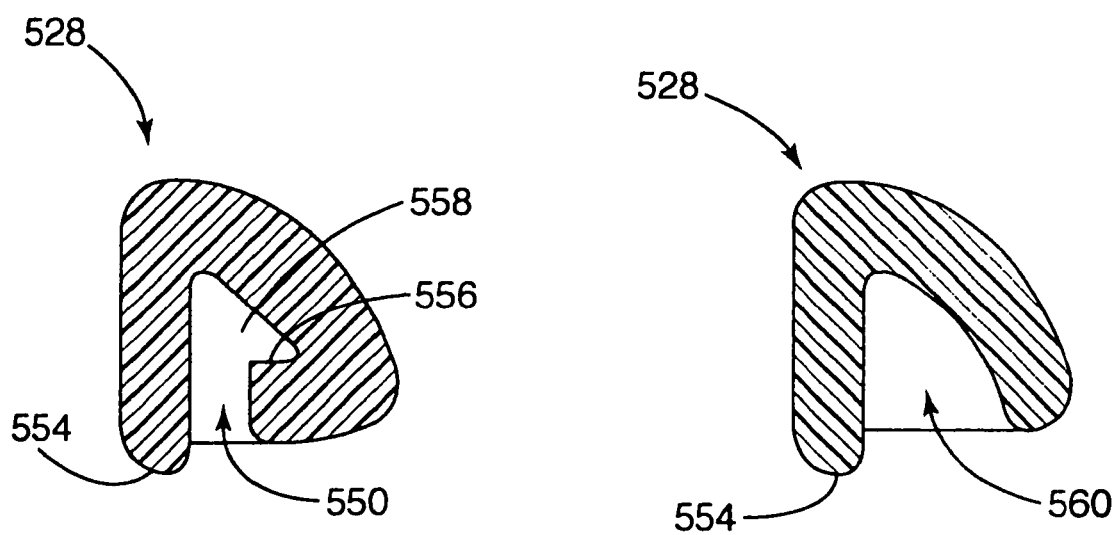
Fig. 23
Fig. 24

CARRIER AND ATTACHMENT METHOD FOR LOAD-BEARING FABRIC

This is a divisional of U.S. application Ser. No. 10/382,792, filed Mar. 6, 2003 (now U.S. Pat. No. 6,899,398), which is a continuation-in-part of U.S. application Ser. No. 10/342,602, filed Jan. 15, 2003 (now U.S. Pat. No. 6,966,606), which is a division of U.S. application Ser. No. 09/666,624, filed Sep. 20, 2000 (now U.S. Pat. No. 6,540,950).

BACKGROUND OF THE INVENTION

The present invention relates to load-bearing fabric, and more particularly to components, tools and methods for securing a load-bearing fabric to a support structure.

The use of load-bearing fabrics continues to grow dramatically in various industries, including the automotive, office and home seating industries. The term "load-bearing fabric" is commonly used to refer to a class of high strength, highly durable textiles that are typically woven from elastomeric monofilaments and conventional yarns. Some of today's load-bearing fabrics have greater strength and durability characteristics than spring steel and other conventional load bearing materials. In addition to their strength and durability characteristics, load-bearing fabrics are lightweight and typically have a high modulus of elasticity. Therefore, they are well-suited for use in a variety of applications where a strong and durable yet lightweight or elastic load bearing surface is desired, for example, in seating, cots and wheelchair applications. Further, because load-bearing fabrics are aesthetically pleasing they can and often are exposed during use, for example, as the seat or back of an office chair. This eliminates the need to cover or trim conventional load bearing surfaces.

One particularly important challenge related to the use of load-bearing fabric is attaching the fabric to the support structure. Although load-bearing fabrics have high strength and durability characteristics, they must be properly attached to the support structure to provide an end product with the desired strength and durability. Conventional attachment methods often fail to provide the necessary strength and durability to withstand the forces applied to the fabric. As a result, the fabric separates from the support structure under conditions that the fabric is otherwise well-suited to survive. In some applications, the bond itself may fail and in other applications, the method of attachment may cause the fabric to unravel or separate along the periphery of the fabric. Accordingly, there is an ongoing effort to develop new and improved methods and components for securing the load-bearing fabric to the support structure.

Perhaps the most common use of load-bearing fabric is in the furniture industry, where load-bearing fabrics are used to form the seat and back of task seating, executive chairs and other office chairs. In the furniture industry, load-bearing fabrics are typically secured to a support structure by a carrier, often in the form of a peripheral frame. The fabric is first attached to the carrier and then the carrier is attached to the support structure, such as the seat frame or back frame. In such applications, the challenge is to secure the carrier in a way that provides a strong and durable bond without damaging or promoting unraveling of the fabric. One conventional method for addressing these issues is to secure the load-bearing fabric to a carrier through encapsulation. In general, encapsulation involves the molding of a carrier in situ about the peripheral edge of the fabric. During the molding process, the material of the carrier flows through and becomes intimately intersecured with the fabric. The carrier is then secured to the support structure using fasteners or other conventional techniques and apparatus.

Although encapsulation provides a strong and durable bond, it suffers from a number of disadvantages. To provide the chair with a firm seat and back, the fabric must typically be tightly stretched over the chair and back frames. The conventional method for providing the fabric with the desired amount of stretch is to hold the fabric in a stretched position while the carrier is molded in place about the fabric. This operation involves the use of expensive looms and stretching machinery. The stretching machinery stretches the fabric to the desired position. The stretched fabric is then mounted to the loom, which holds the fabric in the stretched position during the molding process. It may also be necessary to provide molding equipment that is specially configured to operate while the stretched fabric is held by the loom. Further, when the molded carrier and fabric emerge from the mold, the force of the stretched fabric can cause the carrier to deform, for example, to bow or "potato chip." This creates the need to return the carrier to the desired shape, typically using additional machinery, prior to attachment to the support structure. As can be seen, encapsulation requires a relatively complex manufacturing process that employs expensive looms and stretching machinery.

SUMMARY OF THE INVENTION

The aforementioned problems are overcome by the present invention wherein a carrier for a load-bearing fabric is provided which is expandable to permit the fabric to be stretched after its attachment to the carrier. After the carrier is attached to the fabric, the carrier and fabric are expanded and mounted to the support structure in the expanded condition. The carrier is preferably manufactured from a pliable and resilient polymeric material that is molded in place on the fabric and is capable of being stretched along with the fabric after molding.

In a preferred embodiment, the cross-section of the carrier is controlled to dictate the amount of stretch in various regions of the fabric. For example, the carrier may include a constant cross-section to provide substantially uniform and consistent stretch around the carrier. Alternatively, the cross-section can be increased in regions where less stretch is desired.

In a second preferred embodiment, the carrier includes expansion joints that control the amount and direction of stretch. The expansion joints preferably include a plurality of ribs that extend along the carrier in an "X"-shaped pattern or a single rib in a zig-zag pattern. During initial stretching, the ribs provide relatively little resistance as they pivot or deflect into general alignment with the longitudinal extent of the carrier. Once the ribs are generally aligned with the longitudinal extent of the carrier, they cease pivoting and instead must be elongated or stretched to permit further stretching of the carrier. Elongation of the ribs requires substantially more force than deflection. As a result, the resistance to deformation in a given region increases significantly once that region has undergone initial stretching. This tends to cause the carrier to undergo initial stretching along its entire length before undergoing any further stretching in a given region.

In a second aspect of the invention, the carrier includes corner joints that deform as the fabric is stretched. The corner joints may include corner loops that deform as the fabric is stretched to permit expansion of the carrier without substantial stretching of the carrier. Alternatively, the corner joints may include thinned corners that focus stretching into the corners of the carrier.

In a third aspect of the invention, the carrier and frame include corresponding indexing features. The indexing features interlock to stretch the carrier and fabric a desired amount. The indexing features are selectively tapered to align the carrier and frame when the two are joined and/or to regulate the amount that the carrier stretches between each indexing feature. In one embodiment, expansion joints, in the form of recesses defined in the carrier, are disposed between adjacent indexing features to enable the carrier to stretch in a controlled manner when being joined with the frame.

In a fourth aspect of the invention, the frame includes a flexible portion that maintains the fabric disposed on the carrier in a tensioned condition across a dimension of the carrier and/or frame, but also flexes downwardly without significantly affecting the tension of the fabric across the dimension. Optionally, the flexible frame portion is disposed at the front of the frame to form a "flexible waterfall" front lip of a seat. With the waterfall front lip, the chair seat deflects downwardly to reduce the stress on the undersides of the legs of a user seated in the chair.

The present invention also provides a method for attaching a load-bearing fabric to a support structure. The method generally includes the steps of (a) providing a non-stretched load-bearing fabric, the characteristics of the fabric being preselected to accommodate the desired amount of stretch, (b) attaching an expandable carrier to the fabric while the fabric remains unstretched, the characteristics of the carrier being preselected to accommodate the desired amount of stretch, (c) stretching the carrier and fabric in combination, and (d) attaching the stretched carrier and fabric combination to the support structure.

The present invention further provides a tool for attaching a carrier and load-bearing fabric assembly to the frame. The tool includes a drive roller and a primary roller defining a space therebetween. One or both rollers close together to join the carrier and frame when these components are disposed in the space. The drive roller advances the carrier and frame between the two rollers to substantially join all portions of the carrier and frame. The drive and/or primary roller may be contoured to mate with features of the carrier and/or frame to ensure adequate registration with each.

In one embodiment, the tool also includes one or more alignment rollers that initially align the carrier and frame before these components pass between the drive and primary rollers. The tool also may include a stop to prevent the rollers from crushing the carrier and/or frame when joining these components.

The present invention provides a simple and effective method for attaching a load-bearing fabric to a support structure. The encapsulated bond of the preferred embodiment provides a strong and durable interconnection between the carrier and the fabric. Also, because the carrier is not bonded to the fabric while in the stretched condition, manufacture of the carrier and fabric is relatively simple and inexpensive. Further, the expansion joints provide controlled and consistent stretch along the carrier. Additionally, the corner joints permit the fabric to be stretched without stretch of the carrier or with stretch of the carrier limited to the corner regions. Moreover, the interlocking indexing features on the carrier and frame ensure the fabric is stretched the desired amount when the carrier and frame are joined. Accordingly, the present invention provides for an inexpensive yet strong and highly durable attachment. In addition, the waterfall-type flexible component provides a leg-stress relieving feature that is easily incorporated into the chair without significantly compromising the tension of the load-bearing fabric, and thus firmness of the seat. Furthermore, the tool of the present invention makes it possible to join the carrier to the frame in an efficient manner that significantly reduces production time.

These and other objects, advantages, and features of the invention will be readily understood and appreciated by reference to the detailed description of the preferred embodiment and the drawings.

BRIEF DESCRIPTION OF THE DRAWINGS

FIG. 10 is a top plan view of a first alternative carrier having corner joints in the relaxed state;

FIG. 11 is a top plan view of a first alternative carrier having corner joints in the expanded state;

FIG. 12 is a top plan view of a second alternative carrier having corner joints, showing the carrier in the relaxed state in solid lines and in the expanded state in phantom lines;

FIG. 13 is a bottom plan view of a third alternative carrier having corner joints in the relaxed state;

FIG. 14 is a bottom plan view of a third alternative carrier having corner joints in the expanded state;

FIG. 22 is a broken perspective view of a portion of a first alternative carrier having index recesses and expansion joints;

FIG. 23 is a sectional view of an index recess taken along lines 23—23 in FIG. 22;

FIG. 24 is a sectional view of an expansion joint taken along lines 24—24 in FIG. 22;

DETAILED DESCRIPTION OF THE PREFERRED EMBODIMENT

For purposes of disclosure, and not limitation, the present invention is described in connection with an office chair 10 having load-bearing fabric that forms the seat and back of the chair. The present invention is well-suited for use in a wide variety of other applications incorporating load-bearing fabric, such as other furniture applications, keyboard trays, mouse trays and cots. In the following description, the terms "inner," "outer," "inwardly," "outwardly," "upper" and "lower" are used to refer to directions relative to the geometric center of the fabric. Additionally, the word "expand" means to stretch, deform or otherwise increase the size of the object; the word "stretch" means to expand primarily through longitudinal elongation; and the word "deform" means to expand primarily through deflection or bending.

Figure 1:
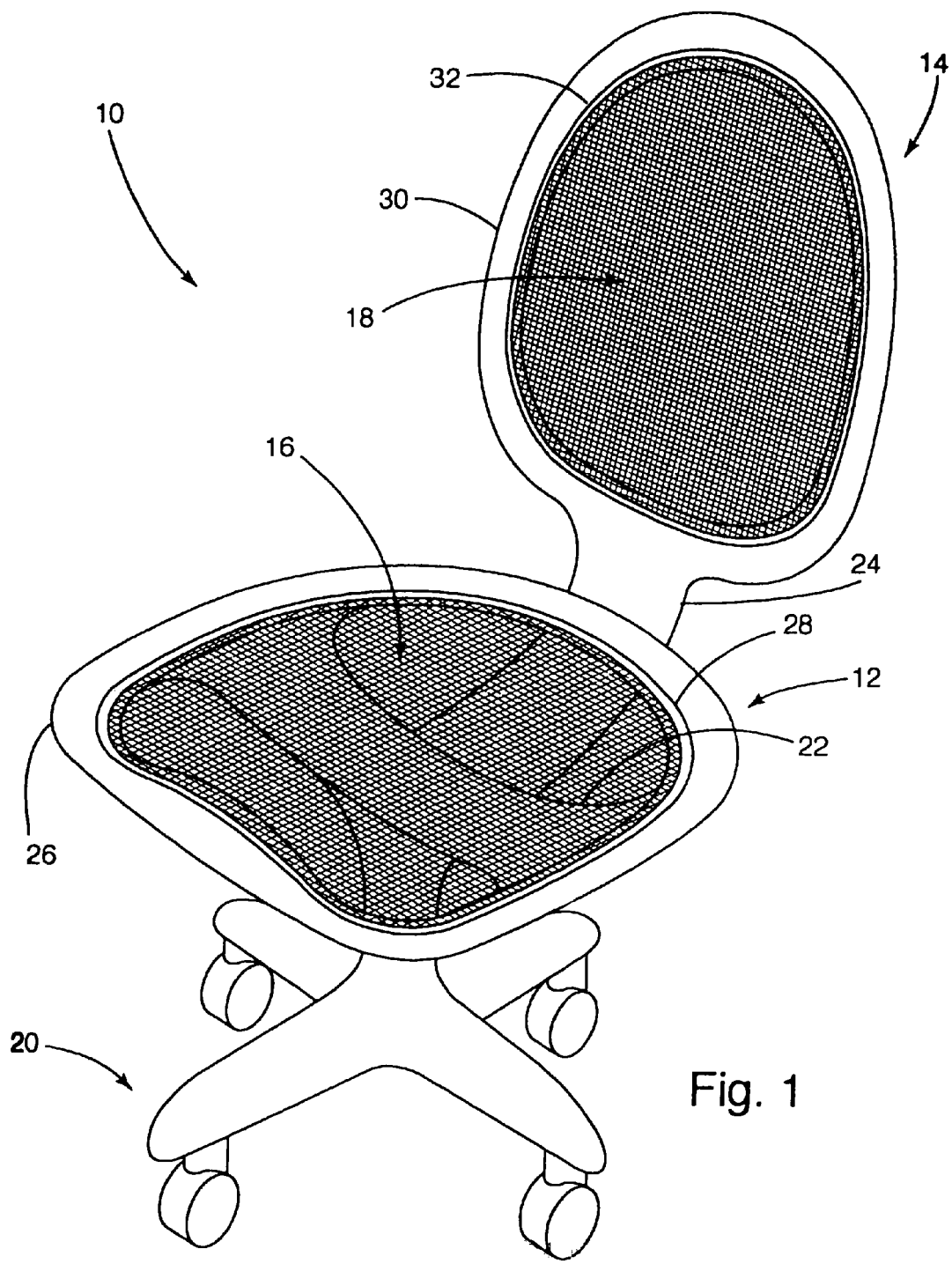
FIG. 1 is a perspective view of an office chair incorporating a preferred embodiment the present invention.

An office chair manufactured in accordance with a preferred embodiment of the present invention is shown in FIG. 1, and generally designated 10. The office chair 10 includes a seat 12 and a back 14, each having a load-bearing fabric 16 and 18 that forms the corresponding support surface. The load-bearing fabric 16 is secured to the seat 12 in a tensioned state by an expanded seat carrier 28. Similarly, the load-bearing fabric 18 is secured to the back 14 in a tensioned state by an expanded back carrier 32. In general, the seat 12 is manufactured by (a) placing an unstretched section of load-bearing fabric 16 in a mold (not shown), (b) molding the seat carrier 28 in situ about the periphery of the unstretched fabric 16, (c) expanding the seat carrier 28 to apply the desired tension to the load-bearing fabric 16, and (d) securing the expanded seat carrier 28 to the seat 12 in its expanded state to mount the fabric 16 to the seat 12 with the desired tension.

The office chair 10 is generally conventional, except for the loading bearing fabric attachment of the present invention. Accordingly, the chair 10 will not be described in detail. In general, however, the chair 10 includes a conventional pedestal 20, top plate 22 and back support 24 that support the seat 12 and the back 14 in a conventional manner. The seat 12 generally includes a seat frame 26, a seat carrier 28 and a section of load-bearing fabric 16. The seat frame 26 is mounted to the top plate 22. The seat carrier 28 carries the load-bearing fabric 16 and is mounted to the seat frame 26 in an expanded state. The back 14 of the chair 10 is constructed in accordance with substantially the same principles as the seat 12. Although the size and shape of the back 14 differ from those of the seat 12, the general components and method of manufacture of the back 14 are substantially identical to those of the seat 12. Accordingly, the construction and method of manufacture of the back 14 will not be described in detail. Suffice it to say that the back 14 includes a back frame 30, a back carrier 32 and a section of load-bearing fabric 18. The back frame 30 is mounted to the back support 24. The back carrier 32 is molded in situ about the fabric 18 while the fabric 18 is in a relaxed state. The back carrier 32 is mounted to the back frame 30 in an expanded state to support the fabric 18 in a tensioned or stretched state.

Figure 2:
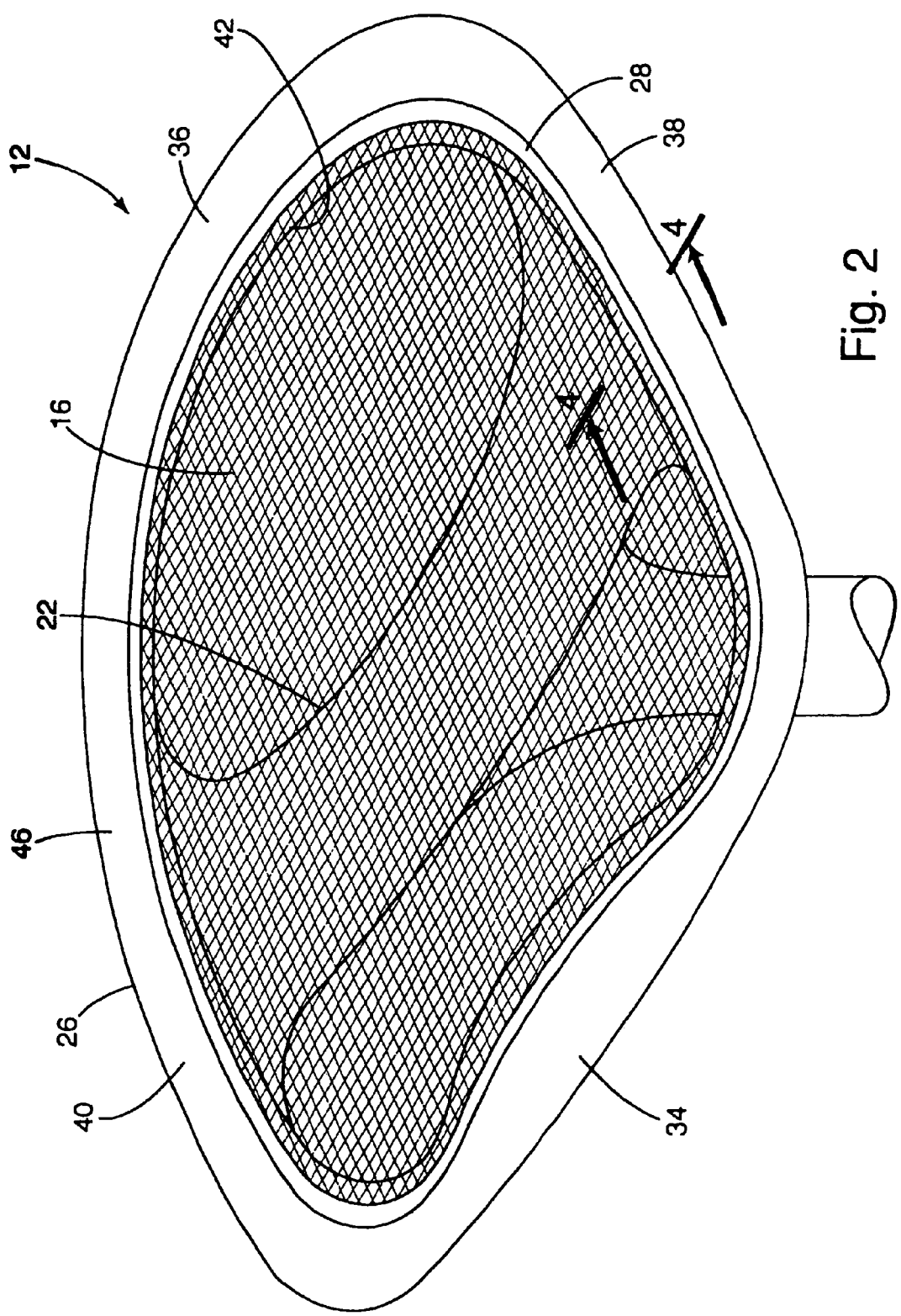
FIG. 2 is a perspective view of the seat.
Figure 3:
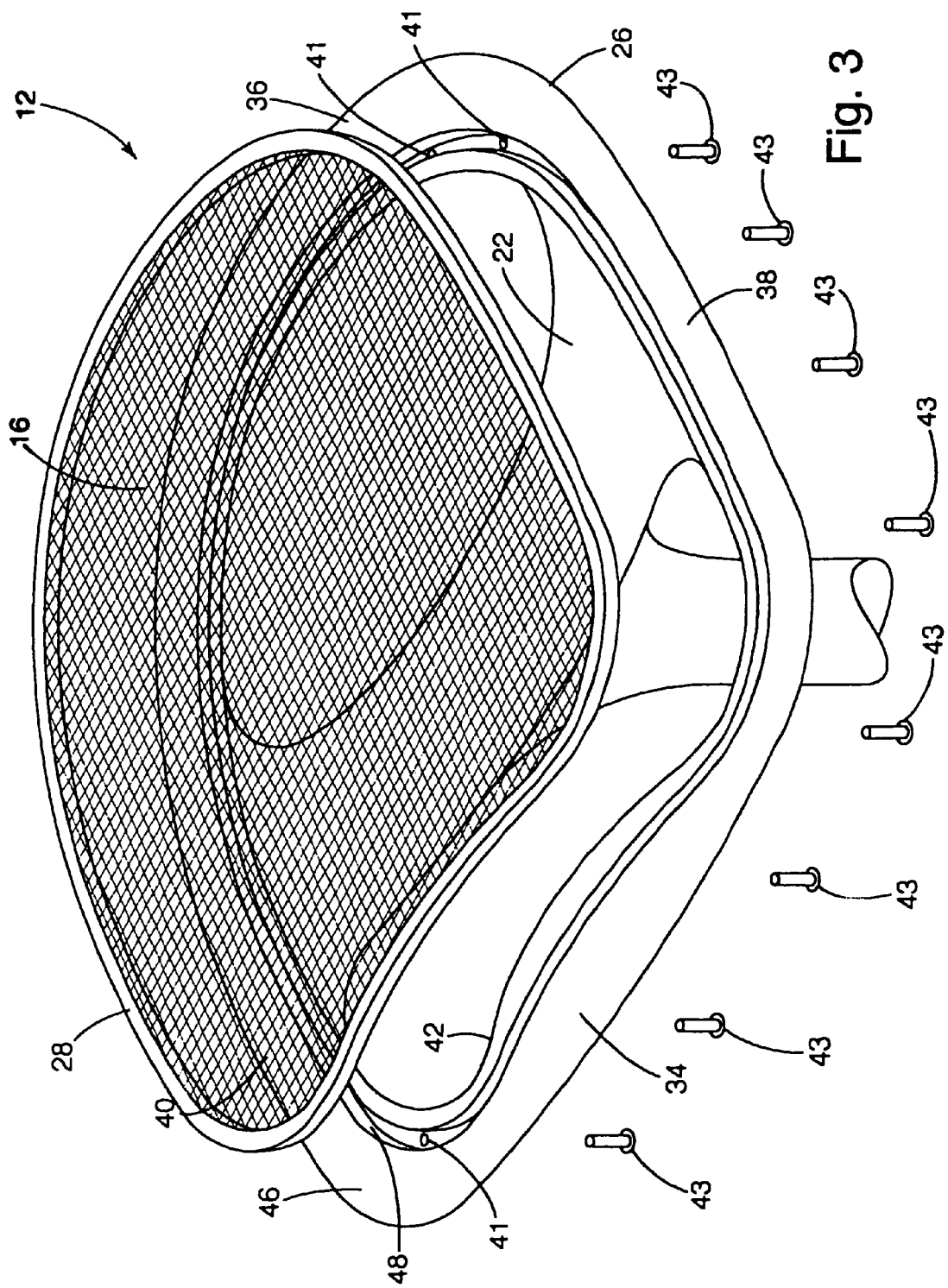
FIG. 3 is an exploded view of the seat frame, seat carrier and load-bearing fabric showing the carrier and fabric in the expanded state.

The attachment structure and manufacturing method of the present invention will be described in detail with reference to the seat 12 portion of the office chair 10. As noted above, the seat 12 includes a seat frame 26 and a seat carrier 28 (See FIGS. 2 and 3). The seat frame 26 is preferably a one-piece component generally including front 34, rear 36, left 38 and right 40 members that are configured to define a somewhat square, peripheral framework about a central opening 42. The precise shape of the seat frame 26 will vary from application to application. Optionally, however, in the alternative seat frame embodiment discussed below, the seat frame may include a flexible portion that interlocks or is integral with the frame. The lower surface (not shown) of the seat frame 26 is adapted to receive fasteners that mount the seat frame 26 to the top plate 22. For example, the lower surface preferably includes screw bosses 41 adapted to receive screws 43 for securing the seat frame 26 to the top plate 22. Obviously, the seat frame 26 can be secured to the top plate 22 in a variety of alternative ways. The upper surface 46 of the seat frame 26 defines a channel 48 adapted to receive the seat carrier 28. The channel 48 preferably extends around the entire seat frame 26, and is of sufficient dimension to receive substantially all of the seat carrier 28. In some applications, the walls or floor of the channel 48 may include tabs, snaps, ridges or other elements (not shown) that help to maintain the carrier 28 in the channel 48. Alternatively or in addition, the bottom wall of the channel 48 may define slots, screw clearance holes, screw bosses or other conventional elements that facilitate secure attachment of the seat carrier 28 within the channel 48. In the preferred embodiment, the seat frame 26 forms the structural component of the seat 12, bearing the occupants weight and being directly supported by the top plate 22. If desired, the seat frame can alternatively be attached to a structural component, such as a seat pan (not shown), that is in turn attached to the top plate or pedestal.

Figure 4:
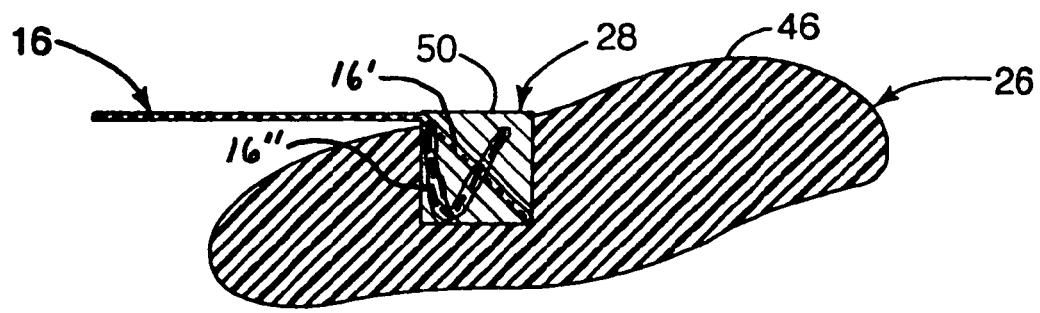
FIG. 4 is a sectional view of the seat carrier and load-bearing fabric attached to the seat frame.
Figure 5:
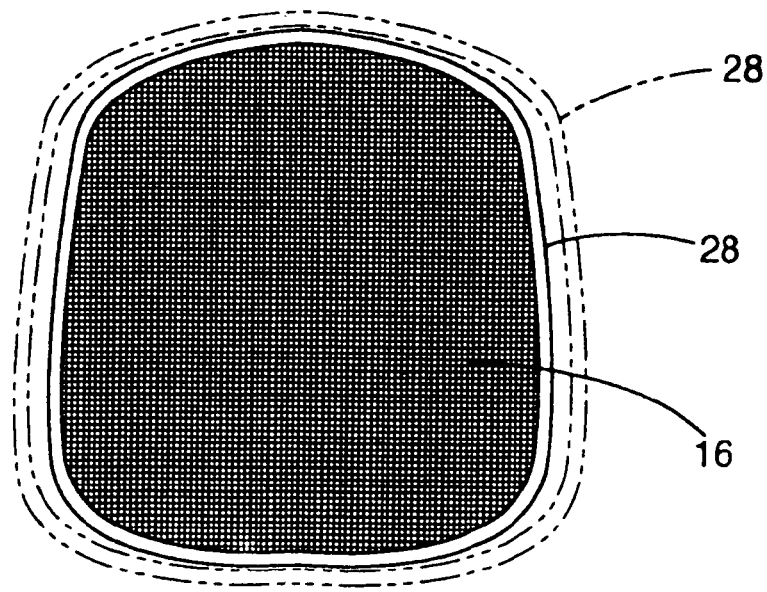
FIG. 5 is a top plan view of the carrier and the fabric, showing the carrier and the fabric in the expanded state in phantom lines.

The seat carrier 28 is preferably molded directly onto the load-bearing fabric 16. As a result, after molding, the seat carrier 28 and the fabric 16 become an integrated, one-piece assembly. The seat carrier 28 is molded onto the load-bearing fabric 16 while the fabric 16 is in a relaxed state, and the seat carrier 28 and fabric 16 are expanded prior to attachment to the seat frame 26. The size and shape of the seat carrier 28 is preselected so that once stretched, deformed or otherwise expanded to place the fabric under the desired tension, the carrier 28 has attained the shape of the seat frame channel 48. For example, if four percent stretch is desired in the fabric 16, the seat carrier 28 can be molded four percent smaller than the channel 48 in the desired direction of stretch. As another example, if four percent stretch in desired in the front/back direction and two percent is desired in the left/right direction, the seat carrier can be molded four percent smaller in the front/back direction and two percent smaller in the left/right direction. In this preferred embodiment, the seat carrier 28 is expanded through a stretching process. The seat carrier 28 is shown in FIG. 5 in its relaxed state in solid line and in its expanded state in phantom lines. As perhaps best shown in FIG. 4, the seat carrier 28 is generally square in cross-section. The load-bearing fabric 16' preferably enters the carrier 28 near the upper surface 50 and extends diagonally down through the center of the carrier 28 to maximize the surface area of the fabric contained within the carrier 28. Optionally, however, the load-bearing fabric 16" may enter the carrier 28 near the upper surface 50, drape downwardly and terminate within the carrier so that no fabric trim line is exposed. Preferably, the cross-sectional area is consistent about the entire carrier 28. This facilitates consistent and even stretching about the carrier. Alternatively, the cross-sectional area of the carrier 28 can be selectively varied to aid in controlling the location of stretch. For example, the cross-sectional area of the carrier 28 in the corner regions may be reduced with respect to the remainder of the carrier 28 to focus stretching in the corners of the carrier 28. This alternative is described in more detail below.

The load-bearing fabric 16 conforms to the desired shape of the seat 12. More specifically, the size and shape of the load-bearing fabric 16 is preselected so that once stretched to the desired tension, it has attained the desired shape of the seat 12. As described in more detail below, the load-bearing fabric may be any of wide variety of load-bearing fabrics, including polyester elastomer fabrics. For purposes of this application, the term "fabric" refers to both woven and non-woven materials, including without limitations knit materials. If desired, woven fabrics with welded warp and weft intersections can be used. These fabrics are particularly well-suited for use in applications in which the material of the carrier is not from the same family of resin as the materials as the fabric. In such applications, the welded intersections permit the carrier 28 to more securely interlocks with the fabric 16. In general, the seat carrier 28 is molded in place about the fabric 16 so that the material of the seat carrier 28 flows through and entraps the warps and wefts to provide a secure interconnection between the carrier 28 and fabric 16. Where the resin of the carrier 28 is from the same family as the resin of the fabric 16, the carrier 28 and the fabric 16 adhere to one another. The encapsulation process not only produces a strong bond, but also reduces the likelihood of the fabric unraveling along its periphery. Although the seat carrier 28 is preferably attached to the fabric 16 using encapsulation, the seat carrier can be separately manufactured and attached to the fabric using conventional attachment techniques. For example, the carrier can be manufactured from two parts that sandwiched the fabric (not shown).

Manufacture and Assembly

Except as described below, the present invention is manufactured using conventional apparatus. The pedestal 20, top plate 22 and back support 24 are manufactured using conventional techniques and apparatus. The top plate 22 is configured in a conventional manner to be interfitted with and supportably receive the seat frame 26. Similarly, the back support 24 is configured in a conventional manner to be interfitted with and supportably receive the back frame 30. The top plate 22 and back support 24 are preferably manufactured from a conventional structural resin. If desired, recliner and other adjustment mechanisms can be incorporated into the pedestal 20 and top plate 22.

The load-bearing fabric 16 is pre-manufactured and is available from a variety of well-known suppliers. For example, the fabric may be manufactured from Dymetrol fabric available from Acme Mills of Detroit, Mich.; Pellicle fabric available from Quantum Inc. of Colfax, N.C.; Collage fabric available from Matrix of Greensboro, N.C. or Flexnet fabric available from Milliken of Spartanburg, S.C. The load-bearing fabric 16 is cut, preferably using conventional die cutting techniques and apparatus. The size and shape of the fabric 16 is preselected, such that it assumes the desired shape once the desired tension is applied. For example, if 5% stretch is desired in a first direction and 2% stretch in a second direction, the fabric can be cut approximately 5% smaller in the first direction and 2% smaller in the second direction. If the fabric is not designed to terminate within the mold cavity, it may be provided with a peripheral marginal portion 17 that can be held between the ejector die and the cover die to hold the fabric in the desired position within the mold.

Figure 6:
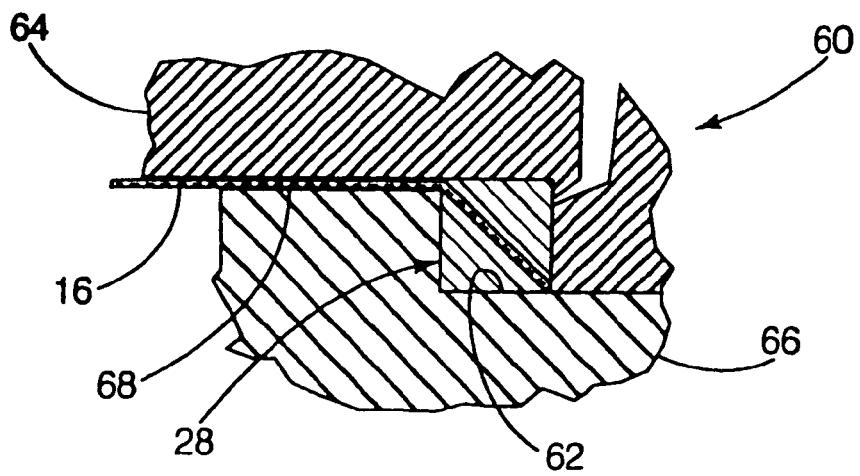
FIG. 6 is a sectional view of the mold showing the fabric in the mold.

Referring now to FIG. 6, the load-bearing fabric 16 is placed in the mold cavity 62 of the mold 60 for the seat carrier 28. The fabric 16 is placed in the mold cavity 62 in a relaxed state with no creases or folds. If desired, the fabric 16 may even include slack, thereby permitting the construction of an end product in which the carrier 28 is stretched more than the fabric 16. As noted above, the fabric 16 may extend through the mold cavity 62 and be trapped along a peripheral marginal portion between the dies 64 and 66 (See FIG. 6) or it may terminate within the cavity (not shown). In the preferred embodiment, the dies 64 and 66 define a slight relief 68 inwardly from the mold cavity to prevent potential crushing damage to the fabric 16 inwardly from the carrier 28 when the dies are closed. The relief 68 is, however, small enough to prevent the flow of molten material out of the mold cavity 62 and into the relief 68. The seat carrier 28 is then injection molded about the periphery of the fabric 16 using generally conventional molding techniques and apparatus. Suffice it to say that molten material is introduced into the mold cavity 62, where it flows through and, after curing, becomes intimately interconnected with the fabric 16. The seat carrier 28 is preferably manufactured from Hytrel 4556 or 5556 available from Dupont, Arnitel EM 440 available from Dutch State Mine ("DSM") of Evansville, Ind. or other thermoplastic elastomers. After the carrier 28 is sufficiently cured, the carrier/fabric assembly is removed from the mold, providing a relaxed fabric 16 contained within a relaxed carrier 28. Any peripheral marginal portion 17 can be trimmed from the fabric 16 as desired. In applications where welded or other fabric is used, the carrier may be manufactured from a thermoplastic elastomer such as EM 400 available from DSM. Materials from other families of thermoplastic elastomers may also be acceptable provided that they have adequate elongation properties (e.g. permit elongation of approximately 3%–8% required to tighten the support component of the fabric).

The seat frame 26 is also manufactured using conventional molding apparatus. The seat frame 26 is molded with channel 48 to receive the seat carrier 28. The channel 48 is not, however, necessary and the seat carrier 28 can be attached to a flat surface of the seat frame 26 using conventional fasteners or the like. The seat frame 26 is adapted to mount to the top plate 22. The seat frame 26 is preferably manufactured from nylon, polypropylene or PET or other structural resins, and may be reinforced with glass fibers or other similar reinforcement materials. After it is sufficiently cured, the seat frame 26 is removed from the mold. A plurality of screw holes 41 are drilled into the frame 26 to receive screw 43 for intersecuring the seat carrier 28 and seat frame 26. The number and location of screw holes 41 will vary from application. As noted above, the screws 43 may be replaced by other attachment mechanisms. For example, the seat carrier 28 and seat frame 26 may be formed with interlocking tabs and slots (not shown) that permit the carrier 28 to snap-lock into place in the frame 26, as described in more detail below. A second set of screw holes (not shown) are drilled into the seat frame 26 to receive screws for attaching the seat frame 26 to the top plate 22.

The seat carrier 28 is next mounted to the seat frame 26. In general, the seat carrier 28 is attached to the seat frame 26 by expanding the carrier 28 and fabric 16 to correspond with the size and shape of channel 48 in the seat frame 26. The expanded carrier 28 and fabric 16 is then fitted into the channel 48, where it is secured by screws 72. The seat carrier 28 can be expanded manually or using expanding machinery, described in detail below, depending in part on the force required to reach the desired amount of stretch. The seat frame 26 is then secured to the top plate 22 to complete assembly of the seat 12.

As noted above, the back 14 is manufactured and constructed in a manner similar to the seat 12. In short, the seat back fabric 18 is cut to the desired shape, the back carrier 32 is molded in situ onto the fabric 18, the back frame 30 is molded, and the back carrier 32 and fabric 18 are expanded and mounted to the back frame 30. The assembled back 14 is then mounted to the back support 24 in a generally conventional manner.

Figure 16:
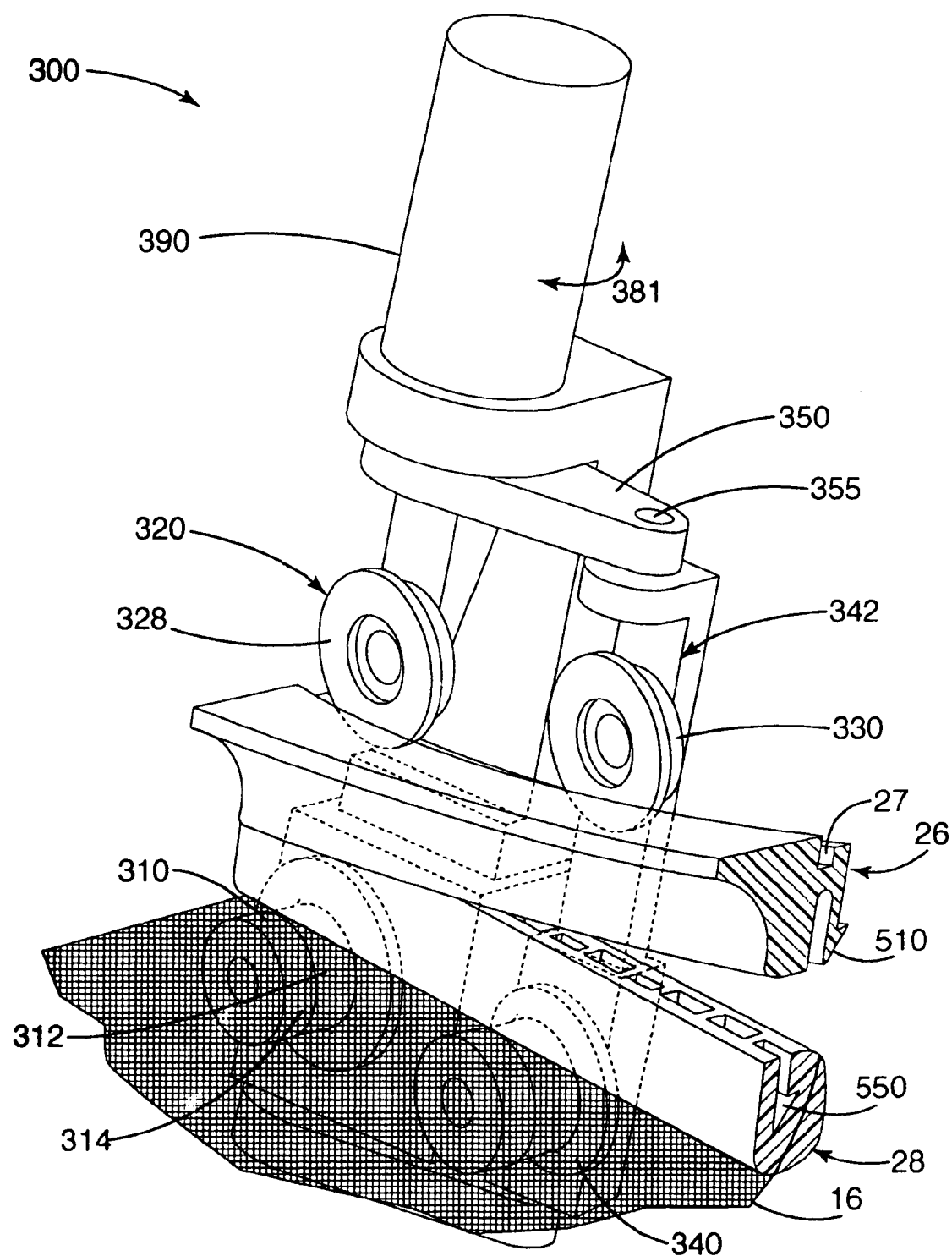
FIG. 16 is a broken side perspective view of expanding machinery of the present invention joining the frame and the carrier along a straight portion.

FIG. 16 shows expanding machinery 300 that may be used to expand the carrier 28 and fabric 16 to correspond with the size and shape of the seat frame 26. The seat frame 26 and carrier 28 include corresponding indices 510 and index recesses 550, respectively, as described in the alternative embodiments below. In general the expanding machine 300 presses the carrier 28 and frame 26 toward one another so that the indices 510 interlock with the index recesses 550. In the process of this interlocking, the fabric 16 is effectively stretched a desired amount.

More specifically, the expanding machinery 300 preferably includes a drive roller 310, a primary roller 320, a carrier alignment roller 330, and a frame alignment roller 340. These rollers are all preferably rotatably mounted to the expanding machine 300.

Figure 17:
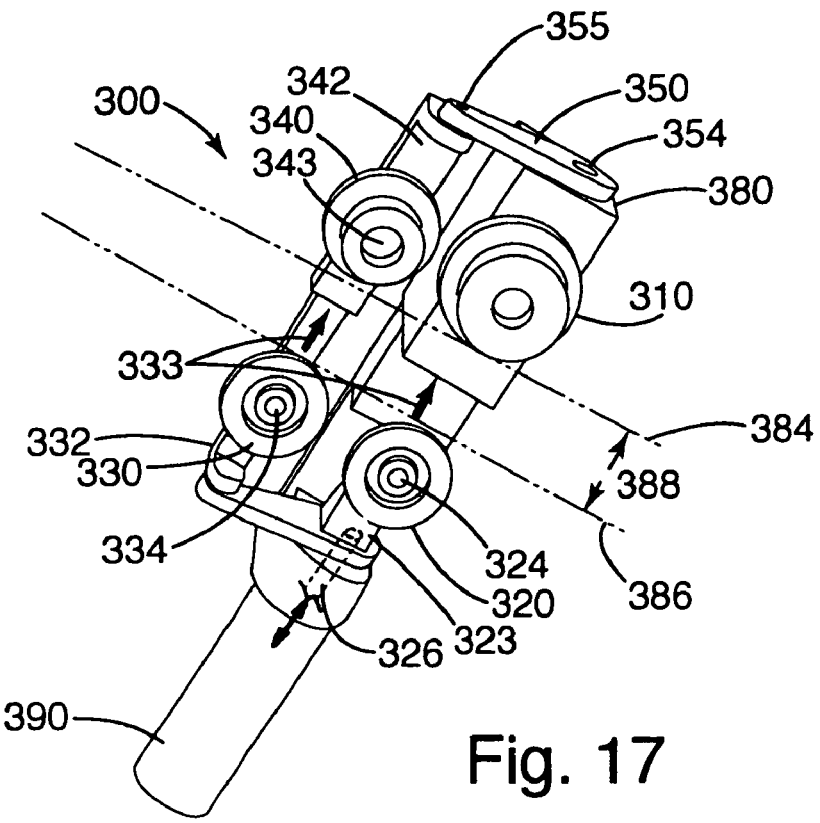
FIG. 17 is a side perspective view of the expanding machinery.
Figure 18:
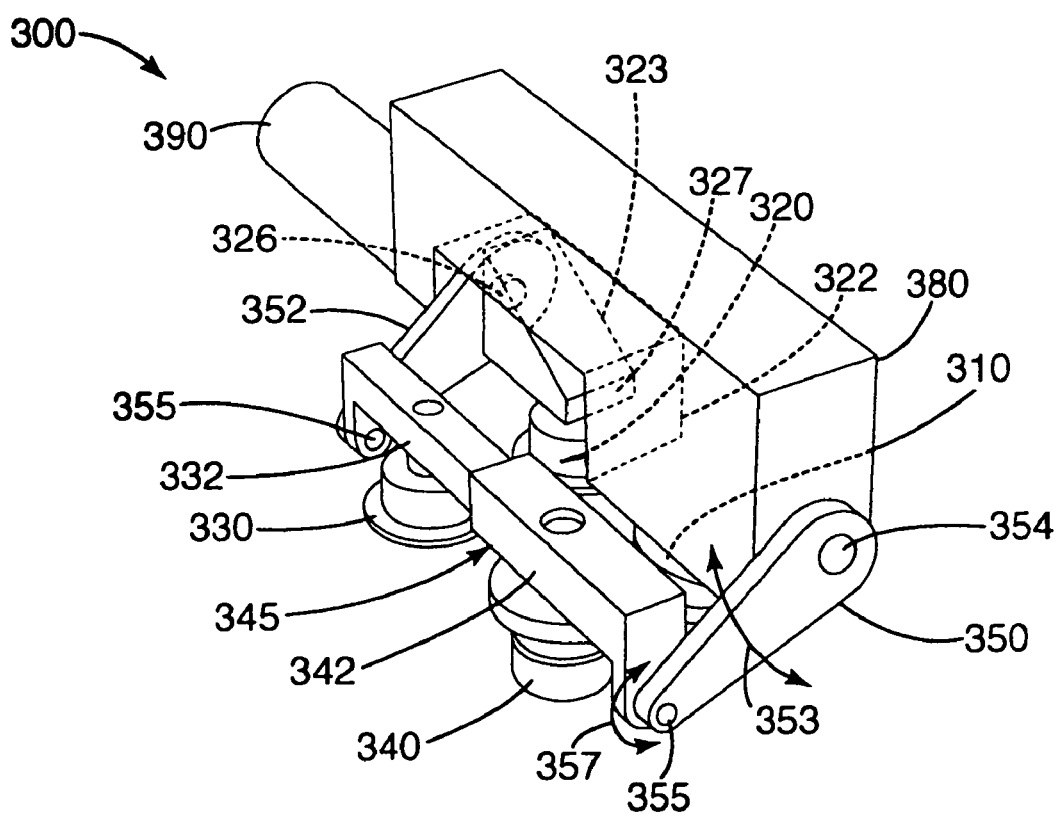
FIG. 18 is a bottom perspective view of the expanding machinery.

As shown in FIGS. 17 and 18, the expanding machinery 300 includes a housing 380 mounted to an arm 390. The arm 390 may be fixed, or mounted on or to a track (not shown). When fixed, the expanding machine 300 advances the carrier 28 and seat frame 26 through the rollers 310, 320, 330 and 340. When mounted on a track (not shown) the arm 390, and subsequently the housing 380, and all other components of the machinery are advanced around a carrier 28 and seat frame 26, interlocking the frame and carrier along the way. In either the fixed or track-mounted set-ups, the housing 380 may be rotatably mounted to the arm 390 so that it may rotate in direction 381, or the arm may be adapted to rotate in direction 381 via conventional rotating means.

The housing 380 includes a drive mechanism, for example, a pneumatic, a hydraulic, mechanical, or other conventional drive mechanism (not shown) to drive the roller. The housing also includes a conventional drive (not shown) to articulate the arms 350 and 352 in the directions 353 (FIG. 18). Further, the housing defines a recess 322 within which primary roller 320 is disposed. The recess 322 preferably is large enough that the fixture 323, to which the primary roller 320 is rotatably mounted via primary roller axle 324, may reciprocate along a path therein. Although shown as a linear reciprocating path 323 in FIG. 17, the fixture 323 or primary roller 320 may reciprocate or otherwise move in a curvilinear or other path as desired. Furthermore, the fixture 323 itself is mounted via shaft 326 to the arm 390 or housing 380 as desired. The shaft also is driven by a conventional drive (not shown) within either of the arm 390 or housing 380 to which it is mounted. Preferably, the fixture includes a stop 327 that prevents the shaft from extending the primary roller more than a desired distance and crushing the carrier and/or the frame between the primary roller 320 and the drive roller 310. As shown, the stop 327 stops extension of the primary roller 320 by abutting the housing 380. Other types of stops may be used as desired, and optionally attached directly to the shaft as the application requires.

Figure 19:
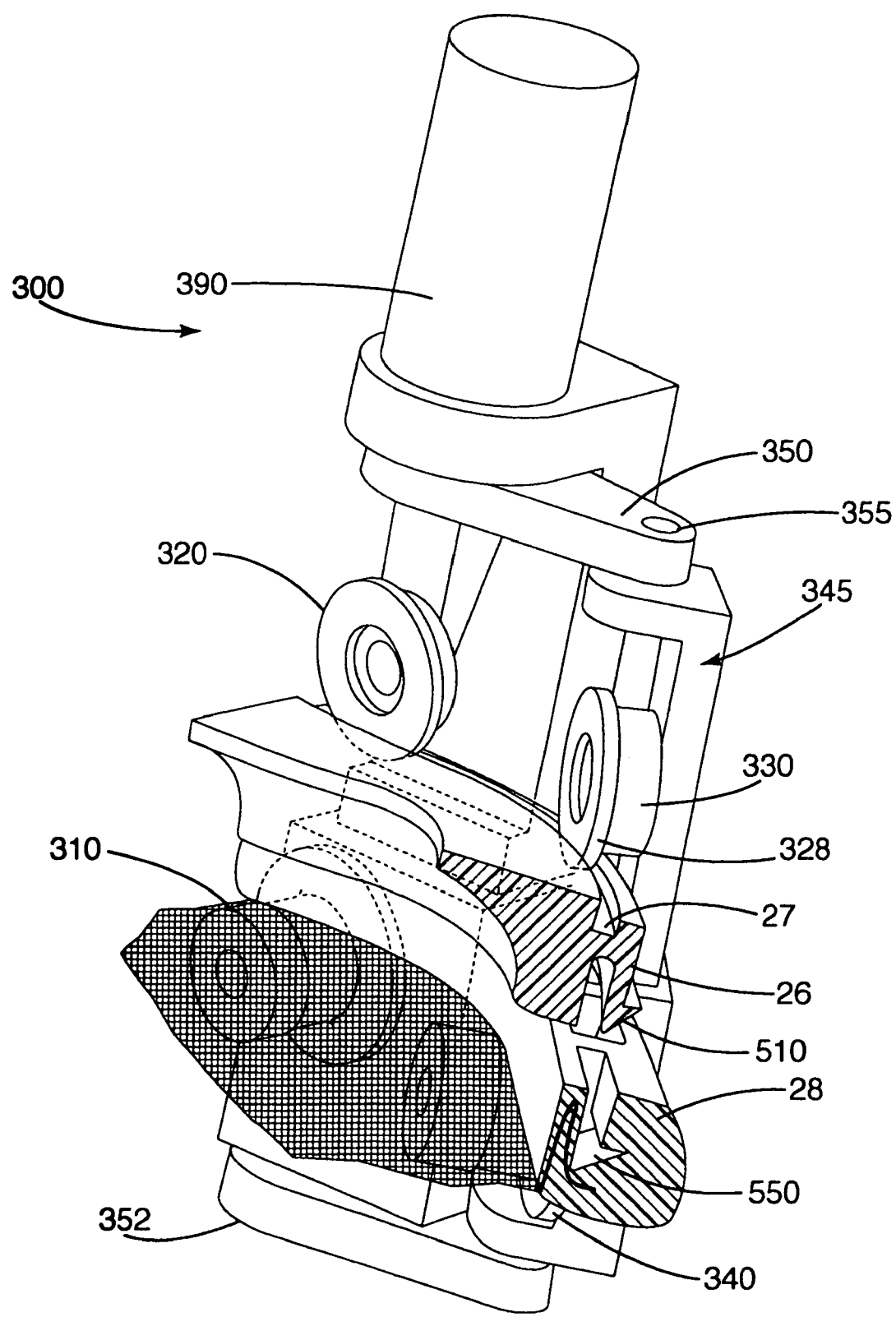
FIG. 19 is a broken side perspective view of the expanding machinery joining the seat frame and the carrier along a curved portion.

The primary roller 320 as shown in FIGS. 16 and 19 includes a flange 328 that tracks within the track 27 of the frame 26 to ensure the frame moves relative to the expanding machine 300 in a controlled and directed manner to facilitate attachment of the carrier. Optionally, the flange 328 interfits completely within the track 27 to ensure a precise movement of the tool relative to the frame. The exact configuration and conforming of the features of the primary roller 320 with the features of the frame 27 may be modified as the application requires.

The drive roller 310 rotates under power provided through the drive (not shown) in the housing 380. As shown in FIGS. 16 and 19, the drive roller 310 is contoured to conform to features of the carrier 28, for example, the upper surface of the carrier. Specifically, the contour includes a groove 312 that interfits over the upper portion of the carrier. Optionally, the groove 312 may be of any desired configuration to match any feature on the carrier 28. As shown, the groove 312 is bounded by the guide rim 314. Although the guide rim 314 is shown stretching a portion of the fabric 16 beside the carrier 28, the rim may be modified so that it does not contact the fabric or only minimally stretches the fabric.

As further shown in FIG. 17, the drive roller 310 has a slightly larger diameter than the other rollers. For example, as shown, the drive roller 310 is of a diameter that provides an additional 10° of rotation relative to primary roller 330. As desired, the diameter of the driver roller may be increased or decreased to provide more or less rotation relative to the other rollers depending on the application. Although the drive roller 310 in the figures is described as the roller that is driven, other or additional rollers may be driven as the application requires.

To the housing 380, an alignment roller bracket 345 is mounted via arms 350 and 352. The arms 350 and 352 pivot relative to the housing 380 via pin 354 and shaft 326, and the bracket 345 pivots relative to the arms 350 and 352 via bracket pins 355. The alignment roller bracket 345 includes a slider bracket 332 that slides in direction 333 shown in FIG. 17. The slider bracket 332 as shown also is slidably coupled to the fixed bracket 342 of the alignment roller bracket 345. However, other bracket configurations that enable the frame alignment roller 330 to move relative to the carrier alignment roller 340, or vice versa, or to move the two together, may be substituted as desired.

In FIG. 17, the carrier alignment roller 340 is rotatably mounted via pin 343 to the fixed bracket 342. As noted above, this roller may be contoured to mate with features of the carrier as desired. As further shown in FIG. 17, the carrier alignment roller 340 aligns with the drive roller 310 along the plane 384.

The frame alignment roller 330 is rotatably mounted via pin 334 to the slider bracket 332 and preferably aligned with the primary roller 320 in plane 386. Optionally, the two planes 384 and 386 are separated to define a space therebetween. This space may be defined by a substantially consistent distance 388 between planes 384 and 386. Further, the distance 388 may be reduced as explained below so that the primary roller 320 and the frame alignment roller 330 move toward the drive roller 310 and carrier alignment roller 340 respectively, in the direction as indicated by arrows 333. Optionally, the drive roller 310 and carrier alignment roller 340 may be urged toward the primary roller 320 and the frame alignment roller 330, respectively, or both sets of rollers may be urged toward one another as desired.

Although shown, the alignment bracket 345, arms 350, 352, frame alignment roller 330, carrier alignment roller 340 and associated components may be deleted from the expanding machine 300 in certain applications. Further optionally, a rotatable slide or a cam may be attached to the frame 26 and/or the carrier 28 to help guide, secure and/or reorient the frame 26 and/or carrier 28 components relative to the expanding machine 360.

The operation of the expanding machine 300 to join the carrier 28 to a frame 26 is generally shown in FIGS. 16 and 19. The frame alignment roller 330 and carrier alignment roller 340 generally track within the seat frame track 27 and along the upper portion of the carrier 28, respectively. The primary roller 340 and drive roller 310 generally track within the seat frame track 27 and along the upper portion of the carrier 28, respectively. The drive roller 310 preferably is rotated with sufficient force to feed the carrier 28 and the frame 26 through the expanding machine 300, between the opposing sets of rollers. As noted above, mating of the upper portion of the carrier 28 within the recess 312 of the drive roller 310 increases the traction of the drive roller 310 relative to the carrier 28 and increases the ability of the drive roller 310 to advance the frame and carrier through the expanding machine 300, or drive the expanding machine around the carrier and frame as desired.

As the drive roller 310 advances the frame 26 and carrier 28 through the expanding machine 300, the frame alignment roller 330 and carrier alignment roller 340 initially align the carrier 28 with the frame 26. As the frame 26 and carrier 28 are further tracked through the expanding machine, these components are further engaged by the driver roller 310 and primary roller 320 so that the indices 510 are brought into further registration with the index recesses 550. When the indices 510 are adequately aligned with the corresponding index recesses 550, the primary roller 320 and the frame alignment roller are urged in direction 333 as shown FIG. 17 to press the indices 510 into the index recesses 550 and interlock the features thereof as described below. Specifically, the shaft 326 extends in direction 333 and the primary roller 320 and frame alignment roller 330 coupled thereto move along with the shaft. With tapered features on the indices or index recesses, as also described below, the indices and index recesses stretch the carrier 28 and, accordingly, the fabric 16 to provide the desired tension in the fabric 16.

When the indices 510 are interlocked with their corresponding index recesses 550, the shaft 326 retracts, moving the frame alignment roller 340 and primary roller 320 away from the carrier alignment roller 330 and the drive roller 310, respectively. At this point, the drive roller 310 may be then re-engaged to advance the frame 26 and carrier 28 through the space defined between the sets of rollers to secure additional portions of the frame and carrier together. Preferably, the expanding machine advances the frame 26 and carrier 28 through it in incremental succession securing one portion and then the next adjacent portion together to provide adequate tension in the fabric 16. As desired, the machine 300 may advance the frame 26 and carrier 28 in greater or lesser degrees depending on the amount of tension desired, the uniformity of the applied tension and/or the configuration of the components.

With specific reference to FIG. 19, the expanding machine 300 is adapted to traverse corner regions and secure the carrier 28 to the frame 26 in these regions. When traversing a corner region, the alignment bracket 345, and subsequently the rollers 330, 340 articulate relative to the rollers 310, 320. Specifically, the alignment bracket 345 pivots on the shaft 326 and pin 354 in direction 353, which depends on the corner traversed. Additionally, the alignment bracket 345 pivots about the pivot pins 355 in direction 357 to assist in traversing corner regions. Accordingly, the frame alignment roller 330 and carrier alignment roller 340 track around the corner as shown in FIG. 19. With this articulating movement of the rollers around the corner, the expanding machine 300 exerts minimal bending pressure on the frame and carrier.

Alternative Embodiments

Figure 7A:
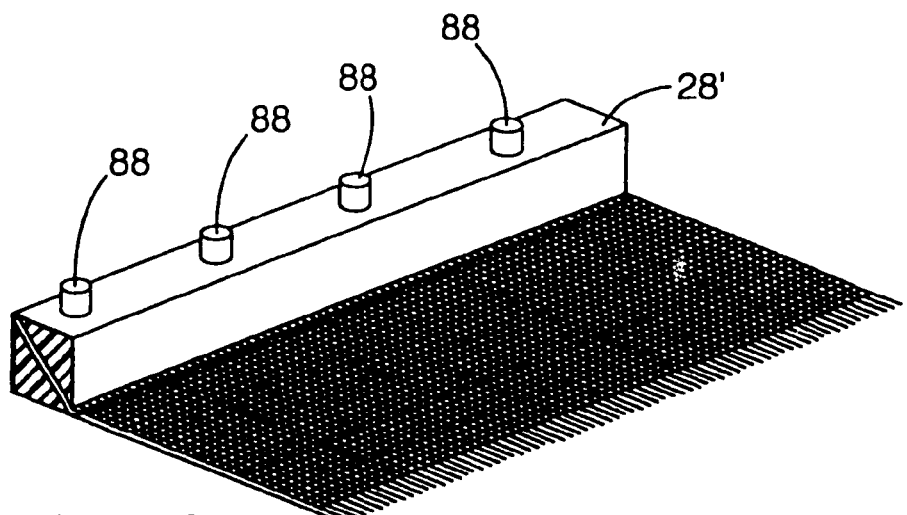
FIG. 7A is a perspective view of a portion of a first alternative carrier having indices.
Figure 7B:
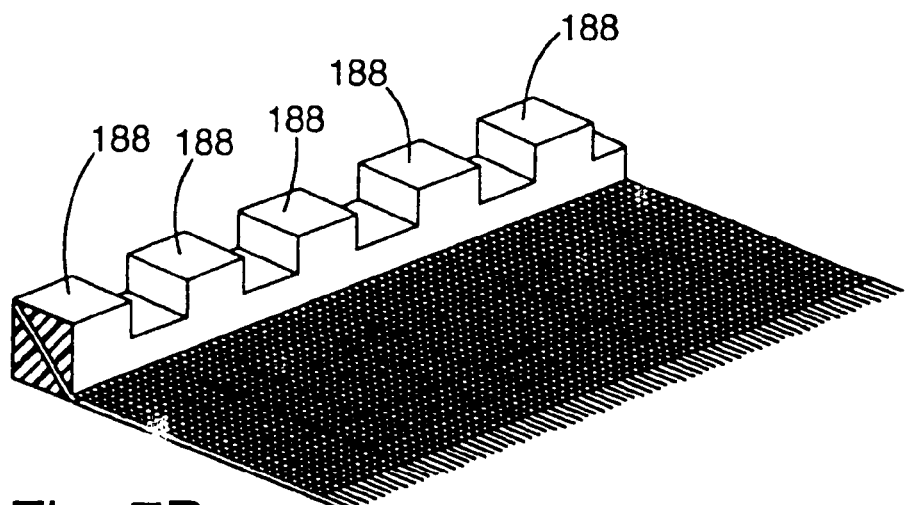
FIG. 7B is a perspective view of a portion of a second alternative carrier having indices.
Figure 7C:
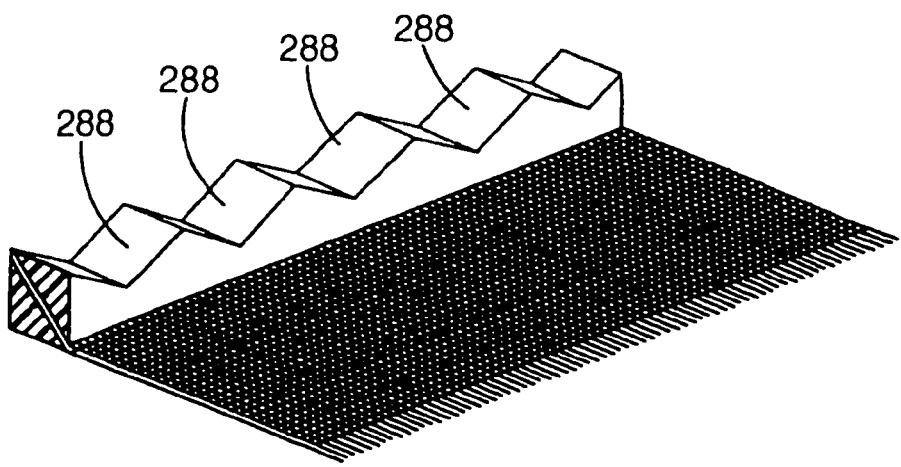
FIG. 7C is a perspective view of a portion of a third alternative carrier having indices.

An alternative embodiment of the present invention is shown in FIGS. 7A–C. In this embodiment, the seat carrier 28' and seat frame (not shown) are generally identical to the seat carrier 28 and seat frame 26 of the above described embodiment, except that the seat frame 26' and seat carrier (not shown) are manufactured with indices 88 that facilitate uniform stretching of the carrier 28' and fabric 18'. In this embodiment, the seat carrier 28' includes a plurality of indices 88 arranged uniformly thereabout. Although not illustrated in the Figures, the seat frame of this embodiment defines an equal number of corresponding apertures (not shown) arranged uniformly thereabout. The apertures are configured to closely receive the indices 88 such that the indices 88 can be inserted into the apertures (not shown) during attachment of the carrier 28' to the frame (not shown) to ensure uniform stretch. The size, shape, configuration and arrangement of indices will vary from application to application. For example, the circular indices 88 can be replace by square 188 (See FIG. 7B), rectangular (not shown) or tapered 288 (See FIG. 7C) indices. In some applications, the carrier may include only a single index, which functions to locate the carrier within the frame, for example, to properly align a logo on the carrier. If desired, the indices 88 can be shaped to interlock with the carrier frame 26, for example, with an enlarge head (not shown) to securely snap into the corresponding aperture 90.

The seat carrier 28' is installed in the seat frame by inserting a first index 88 into the corresponding aperture, and then serially inserting each additional index 88 into each corresponding aperture. The process can be performed manually or using machinery capable of "stretch rolling" the seat carrier 28' into place, such as that described above. If desired, the indices 88 can be used to intentionally vary the amount of stretch throughout various regions of the carrier

28'. For example, the indices 88 can be arranged to provide increased stretch throughout specific regions of the carrier 28' by increasing the spacing of the apertures in the frame while maintaining the uniform spacing of the indices 88 or by decreasing the spacing of indices 88 while maintaining the uniform spacing of the apertures.

Figure 8:
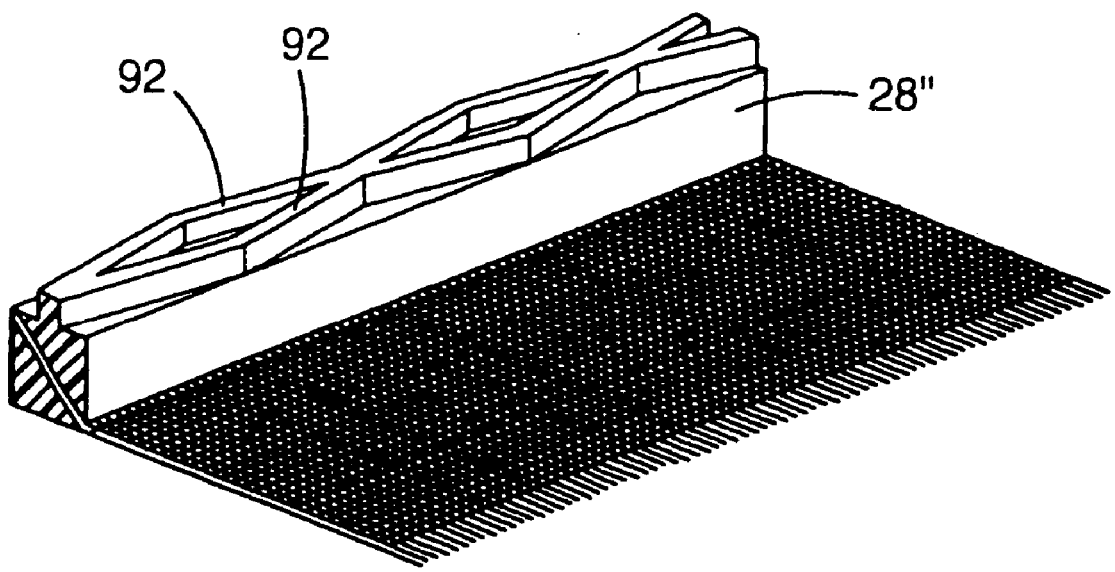
FIG. 8 is a perspective view of a portion of a first alternative carrier having expansion joints.
Figure 9:
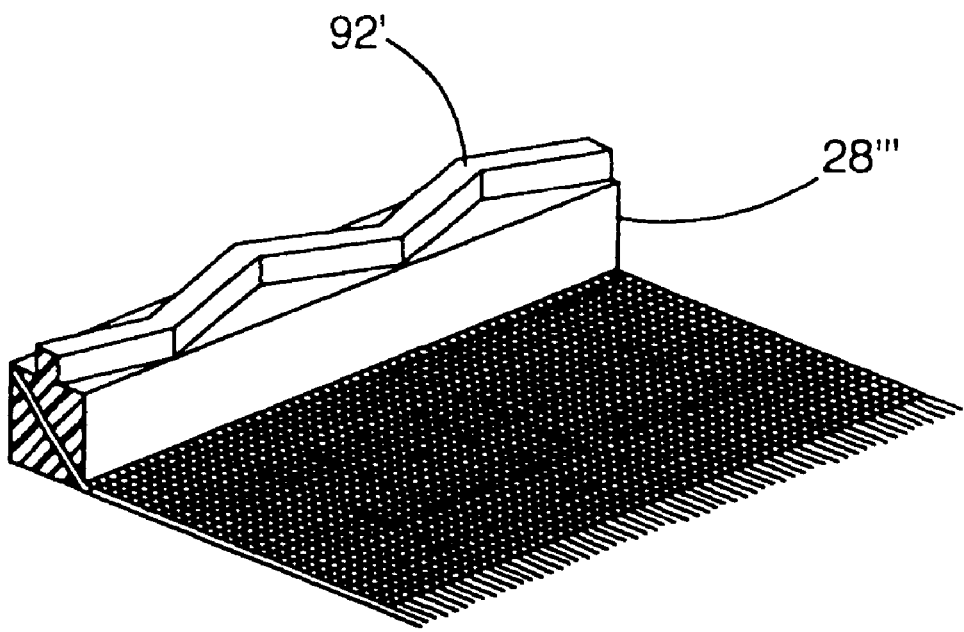
FIG. 9 is a perspective view of a portion of a second alternative carrier having expansion joints.

A second alternative embodiment of the present invention is shown in FIG. 8. In this embodiment, the carrier 28" is formed with integral expansion joints to facilitate uniform stretch in the carrier 28". As illustrated in FIG. 8, the expansion joints are defined by an X-shaped pattern of ribs 92 forms along the bottom of the carrier 28". During initial stretching, the angled ribs 92 pivot or deflect into toward the direction of stretch. This pivot or deflection provides relatively little resistance to stretching of the carrier because it requires relatively little elongation of the ribs 92. Once the ribs 92 have deflected to the point where further deflection is inhibited (e.g. the ribs are in general alignment with the direction of stretching), any further stretching requires substantially more elongation of the ribs 92, thereby increasing the resistance to further stretching. Because of this increase in resistance after initial stretching, the carrier 28' will tend to undergo initial stretching about its entirety before undergo further stretching in any specific region. Alternatively, the X-shaped ribs 92 can be replaced by a single, zig-zag rib 92' that extend along the entirety of the carrier 28''' (See FIG. 9).

A third alternative embodiment is shown in FIGS. 10–12. In this embodiment, the carrier 128 includes corner joints 130a–d that deform during expansion of the carrier 128 to permit expansion without significant stretching of the carrier 128. Referring to FIG. 10, the carrier 128 includes generally straight sections 132a–d interconnected by corner joints 130a–d. The corner joints 130a–d are generally loop-shaped portions dimensioned and shaped to deform or deflect to the desired shape when the carrier 128 is expanded (See FIG. 11). The precise size and shape of the corner joints 128 will be selected to provide the desired expansion. In fact, the corner joints 128 can be shaped to provide different amounts of stretch in different directions by varying the size and shape of the corner joints. For example, larger loops can be used to provide greater stretch and smaller loops can be used to provide lesser stretch. In the embodiment of FIGS. 10 and 11 the corner joints 128 are adapted to provide significant expansion in the directions of lines A and B. To expand the carrier 128, opposed straight section 132a, 132c and 132b, 132d are gripped and drawn apart. This causes the corner joints 130a–d to deform, essentially deflecting or bending open to bring the straight sections 132a–d into general alignment with the outermost extreme of the corner joints 130a–d. In contrast, the alternative embodiment shown in FIG. 12 includes corner joints 130a–d' designed to provide controlled stretch in primarily only a single direction. With this embodiment, the carrier 128' provides primary expansion in the direction of line A and only minimal expansion in the direction of line B. To expand the carrier 128', the straight sections 132b and 132d are drawn apart from one another causing deflecting of the corner joints 130a–c' to bring the straight sections 132b and 132d into general alignment with the outermost extreme of the corner joints 130a–d.

Figure 15:
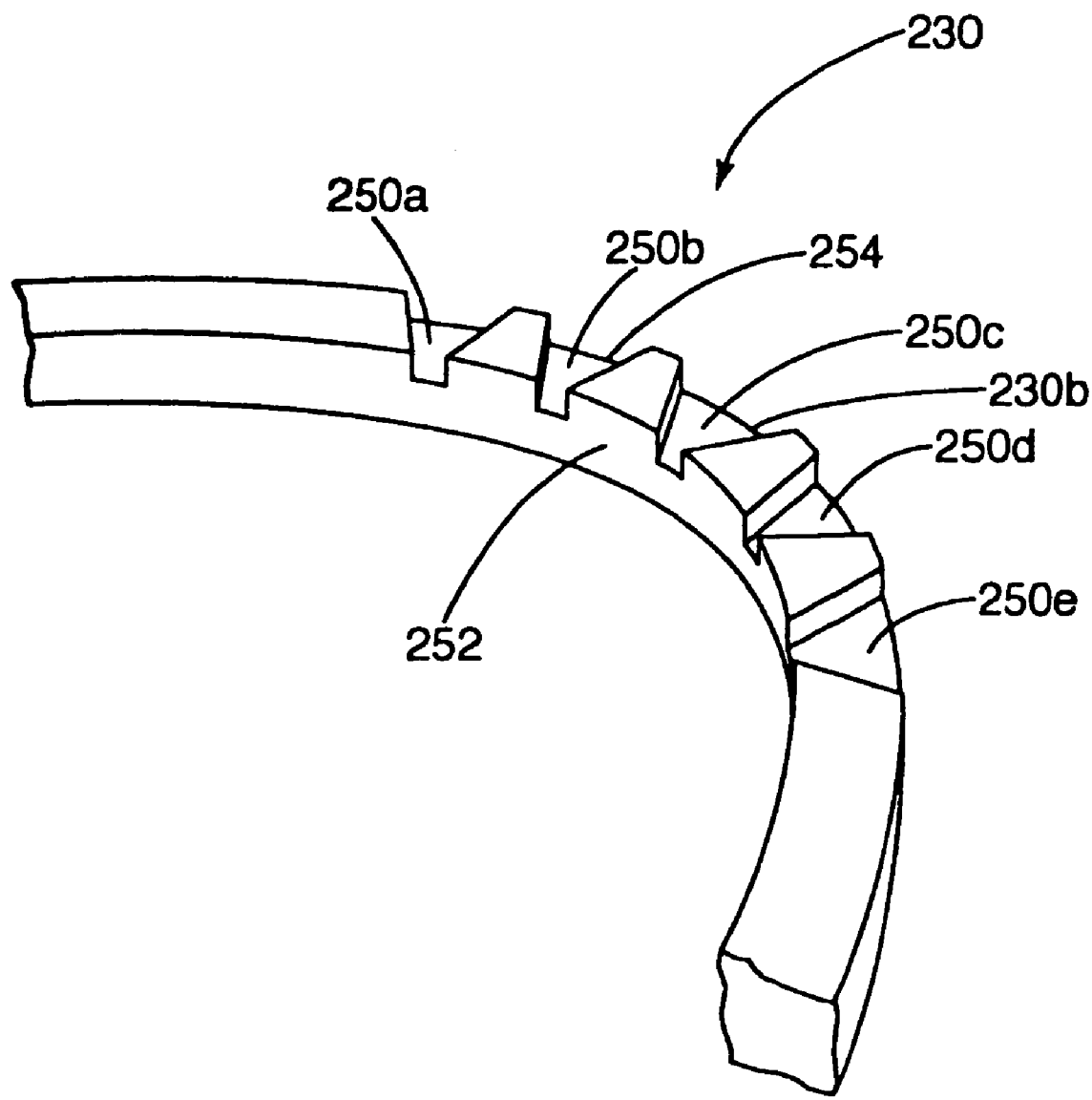
FIG. 15 is a bottom perspective view of a portion of the third alternative carrier having corner joints in the expanded state.

A seat 238 carrier with alternative corner joints 230a–d is shown in FIGS. 13 and 14. In this embodiment, the corner portions of the carrier 238 are designed to stretch rather than deflect or bend during expansion. In general, the corner joints 230a–d are provided with a reduced cross-sectional area to focus stretching in the corners. As shown in FIGS. 13–15, the corner joints 230a–d preferably include cut out sections 250a–e, which define areas of reduced resistance to stretching, and consequently focus stretching of the carrier 238 in the corners. The cut-out sections 250a–e are preferably tapered to provide uniform stretching transversely across the carrier 238. Because of its curved configuration, the corners will undergo progressively increased stretching as you move from its innermost edge 252 to its outermost edge 254. By tapering the cut out sections 250a–e so that the necessary amount of stretch is proportional to the width of the cut out section 250a–e, expansion can occur without causing bowing or twisting in the corner joints 230a–d. Alternatively, the cut outs 250a–e can be eliminated and the cross-sectional area of the corner joints can simply be reduced uniformly throughout (not shown).

A fourth alternative embodiment is illustrated in FIGS. 20–24. In this embodiment, the carrier 528 and frame 526 include complimentary spaced-apart locating indices 510 and index recesses 550. As used herein, the indices may also be referred to as snaps and the index recesses may be referred to as snap recesses. Preferably, each of the indices 510 corresponds to a specific index recess 550. Although shown with the indices 510 on the frame 526 and the index recesses 550 defined by the carrier 528, the indices and index recesses may be reversed so that the indices 510 are on the carrier 528 and the recesses are defined by the frame 526. Optionally, the indices 510 and recesses 550 may be associated with both the carrier 526 and the frame 528 in an alternating or other patterned configuration.

The multiple indices 510 preferably are mounted on or integral with an edge profile 520. The edge profile 520 is joined with a frame wall 530. The union between the wall 530 and the edge profile 520 preferably defines a groove or track 532 within which the inner wall 554 of the carrier 526 interfits or rests when the frame 526 and carrier 528 are joined. Opposite this groove or track 532 is the track 27, which is configured to mate with one or more rollers of the expanding machine 300 described above.

Figure 20:
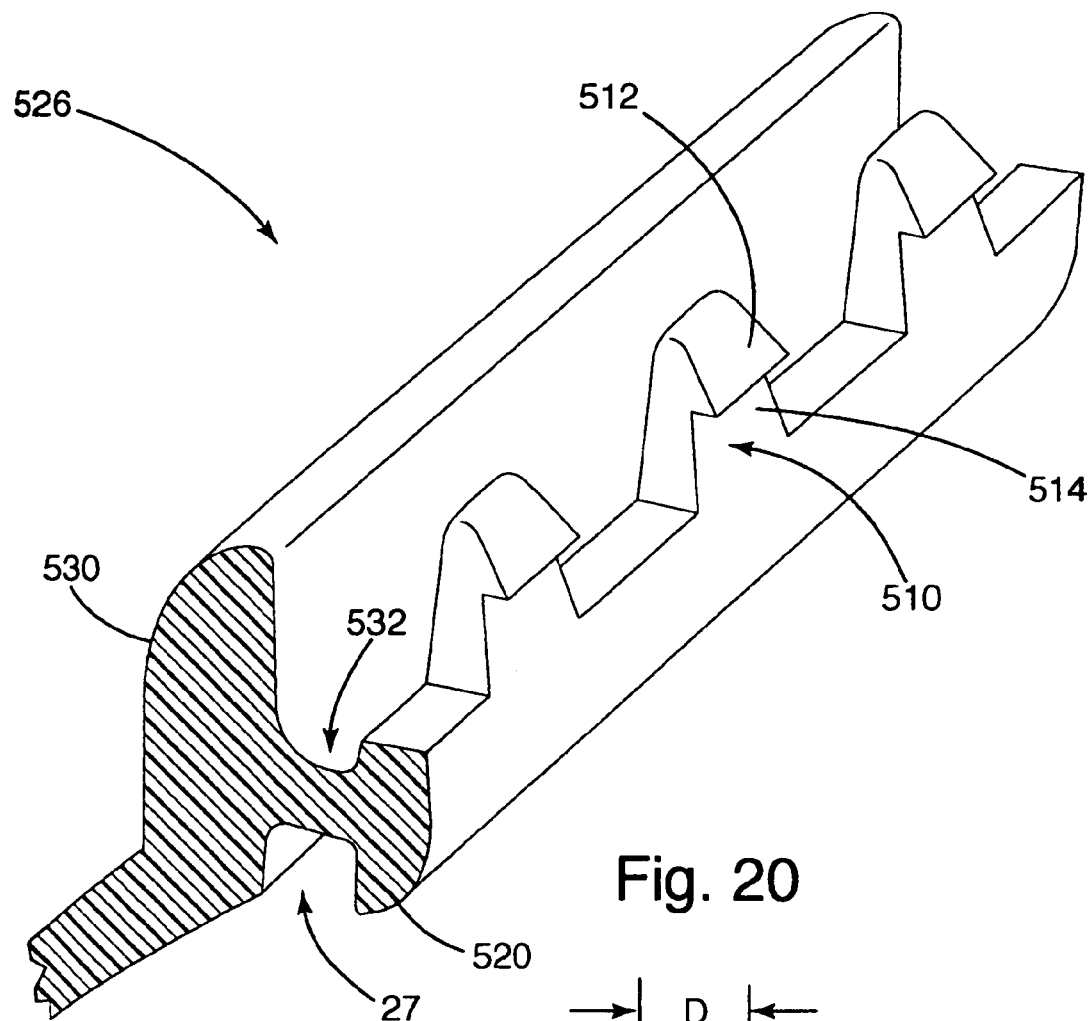
FIG. 20 is a broken perspective view of a portion of a first alternative frame having indices.
Figure 21:
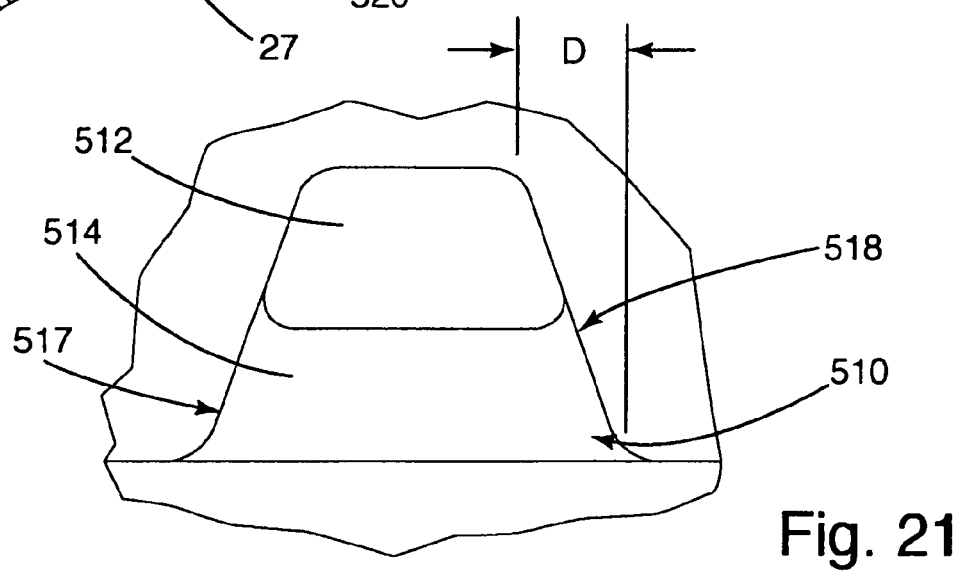
FIG. 21 is a front perspective view of an index feature of the first alternative frame.

With further reference to the fourth embodiment of FIG. 20, the indices 510 are disposed at a distance from a wall 530 of the frame 526. The indices preferably include a head 512, also referred to as a hook in the shown embodiments, secured to or integral with a base 514. The base 514 and/or hook 512 may be tapered along one or both sides 517 and 518 of the indices as shown in FIG. 21. Preferably, the distance D between the edge of the base 514 and the top edge of the hook 512 is less than or equal to the desired amount of carrier stretch that results when the indices 510 are interlocked with the index recesses 550 when the carrier 528 is joined with the frame 526. In effect, when a recess 550 is registered with a corresponding index 510, a wall 558 of the recess interferes with one or more of the sides 517, 518. As the index 510 enters the recess, the recess wall 558 continues to interfere with one or more of the sides 517, 518. With these sides tapered, the wall 558 is guided along the taper. This in turn stretches the carrier. Upon full registration of the index in the recess, the carrier preferably stretches distance D. Additionally, as shown in FIG. 20, base and/or hook may be tapered on sides 515 and 519. This taper assists in guiding the carrier outward and over the hook 512.

With reference to FIGS. 22 and 23, the carrier 528 of the fourth alternative embodiment defines one or more index recesses 550. The recesses 550 as shown are independent from one another, and correspond to at least one corresponding index 510 on the frame 526. However, one recess may be oversized and correspond to multiple indices 510 as desired. The recesses 550 generally have a cross-section that corresponds at least in part to the shape and/or structure of the indices 510. Specifically, the recesses preferably include locking edge 556 or lip, which the hook 512 engages and/or interlocks with when the indices 510 are inserted into the recesses 550. Optionally, the recess walls 558 may be tapered, and as described above, in relation to the indices 510, the taper of the walls may be preselected to regulate the amount of carrier stretch, and/or tension applied to the fabric on the carrier when the carrier 526 and frame 528 are joined.

The size, shape, configuration and arrangement of the indices 510 and recesses 550 may vary from application to application. For example, the taper of the indices 510 and/or index recesses 550 may be altered to provide different amounts of stretch to the carrier and tension in the fabric. As another example, the shape of the indices and/or recesses may be changed from a generally trapezoidal shape as shown to a triangular, rounded, parabolic, rectangular, or other shape as desired.

FIGS. 22 and 24 illustrate the recesses 550 selectively separated from one another by one or more expansion joints 560 defined by the carrier 526. The carrier 526 adjacent the expansion joints preferably is of a pre-selected cross section to deform, deflect and/or stretch to the desired shape when the carrier is expanded (FIGS. 5 and 11).

Figure 25:
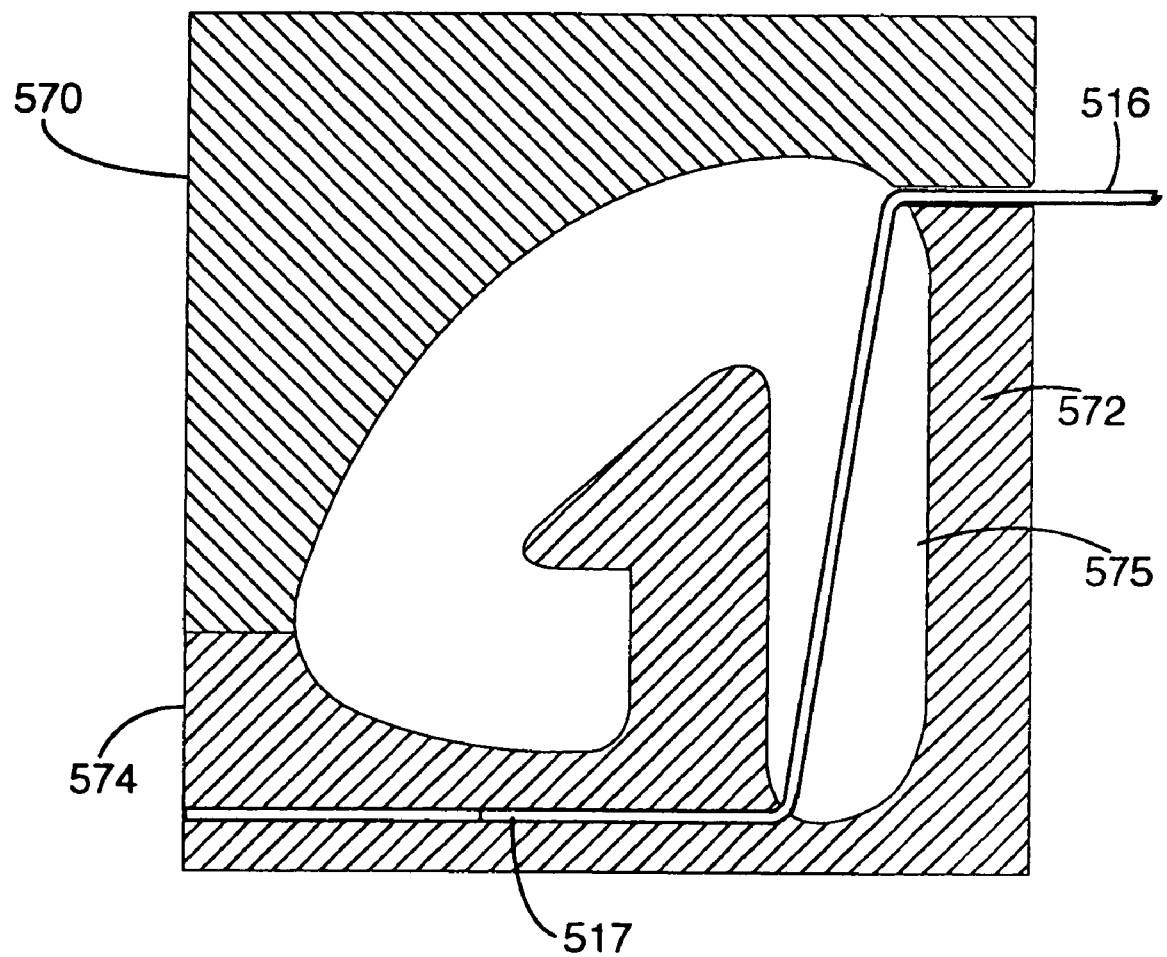
FIG. 25 is a sectional view of a first alternative molding configuration for attaching the carrier and the fabric.

The carrier 528 of the fourth alternative embodiment is secured to the fabric 516 using one of several processes. In one process, shown in FIG. 25, a multiple piece mold is provided to secure the fabric 516 to the carrier 528 in situ. The mold includes an ejector 570, a cover 572 and a plate 574. The plate 574 holds the fabric 516 against the cover 572, securing it in place as a mold material is introduced into the cavity 575 and encapsulates the fabric as described in detail above. With the plate 574 holding the fabric in place at the bottom of the mold, the fabric trim line or edge 517 in the finished product is disposed in the bottom of carrier 528 when molding is complete. In this position, the trim line is usually not visible to the end consumer when the carrier is installed on the frame.

Figure 26:
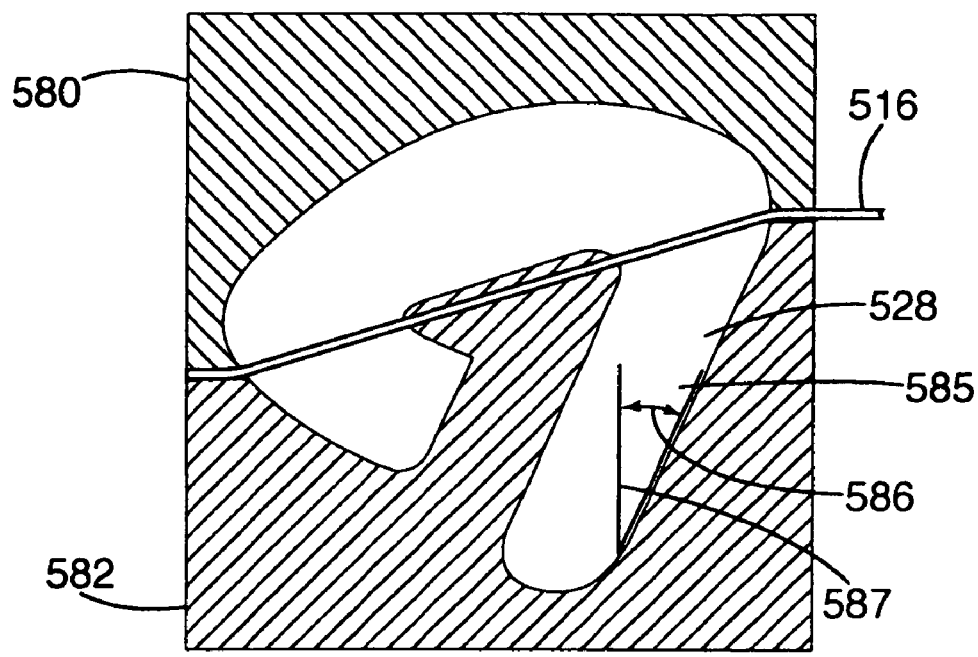
FIG. 26 is a sectional view of a second alternative molding configuration for attaching the carrier and the fabric.
Figure 27:
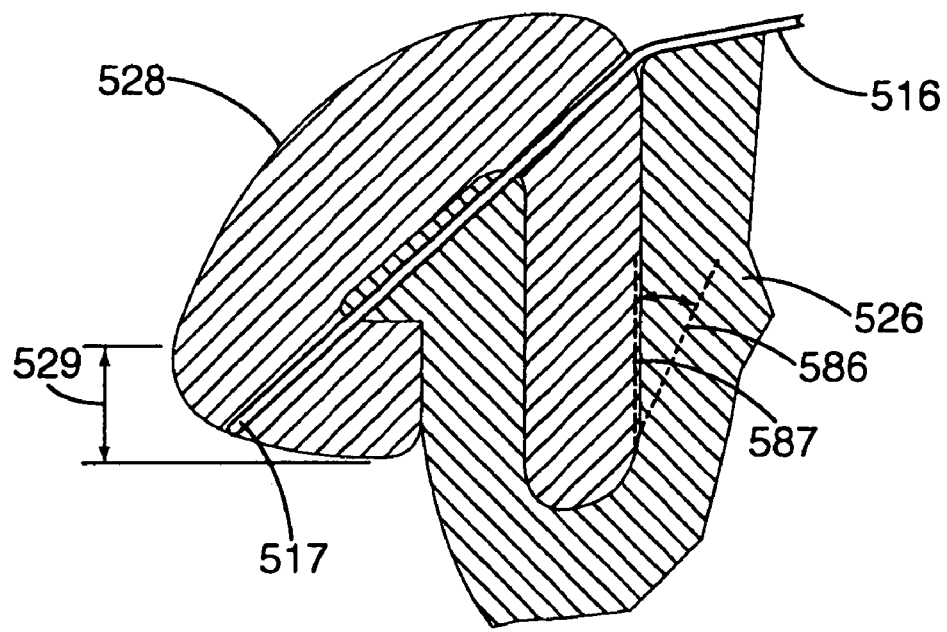
FIG. 27 is a sectional view of the seat carrier and fabric molded according to the second alternative molding configuration and attached to the frame.

In another process, shown in FIG. 26, the fabric 516 is molded to the carrier 528, (shown as cavity 585), which is then rotated a predetermined angle 586 from a neutral position 587. In this process, the fabric 16 is disposed within the carrier cavity 585 and material is introduced into the mold cavity 585 in a conventional manner. After curing, the carrier 528 is removed from the ejector 580 and cover 582. When the carrier 528 is secured to a frame 526 (FIG. 27), the carrier 528 rotates from the angle 586 to the neutral position 587 and is held in this position by the interlock of the indices 510 and recesses 550. Accordingly, in this rotated-from-mold-position, the trim edge of the fabric 517 is visible (if at all) only on the lower portion 529 of the carrier 528.

Figure 28:
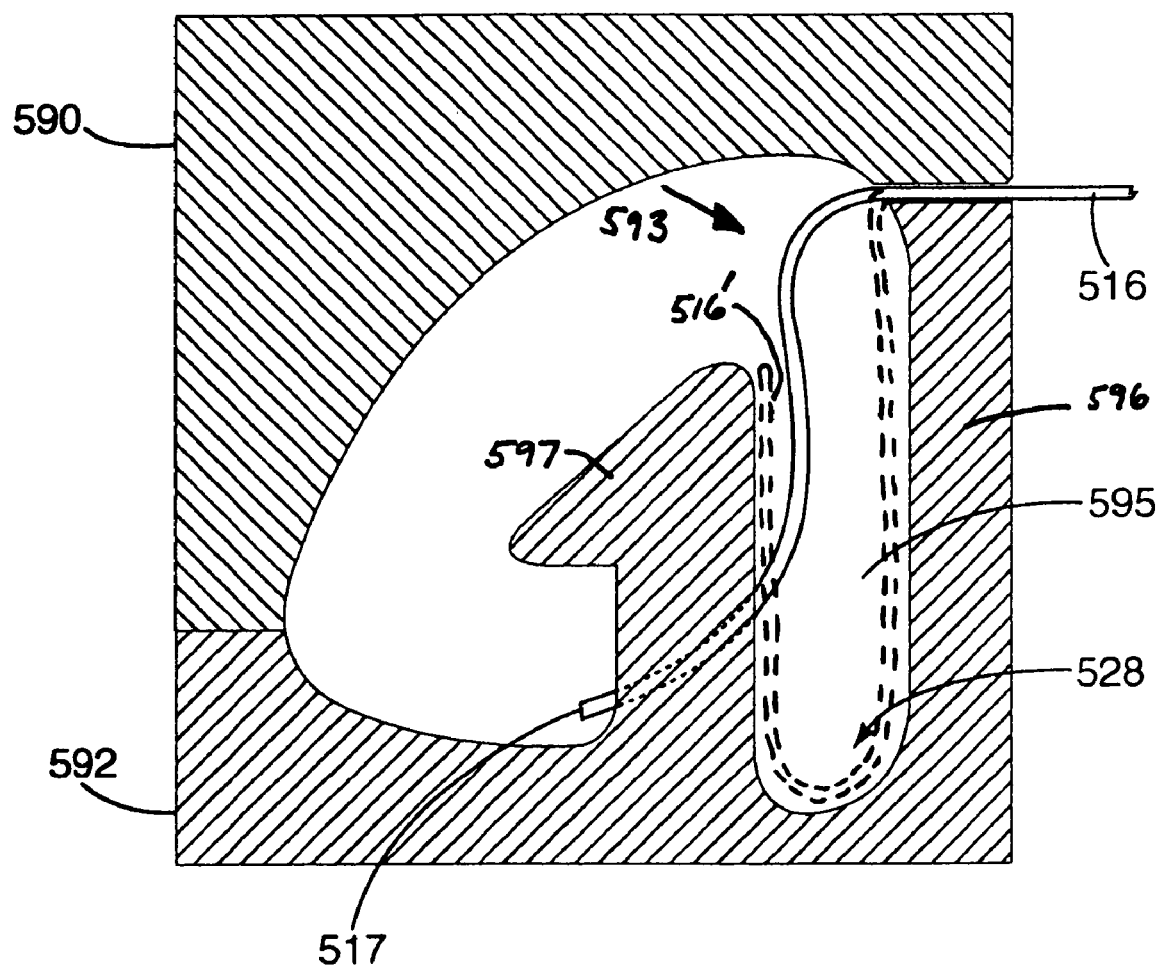
FIG. 28 is a sectional view of a third alternative molding configuration for attaching the carrier and the fabric.

In another process for molding the fabric to the carrier shown in FIG. 28, the fabric 516 is terminated within the mold cavity 595. The fabric 516 may be held in place with pins or lifters (not shown) so that the end 517 of fabric 516 is within the cavity 595. Optionally, the fabric 516' (shown in broken lines) in the cavity 595 may be draped and/or stuffed between the mold wall 596 and mold indice 597. This fabric is held in place due to its interfit between these features. Moreover, with carrier material optionally injected into the mold in direction 593, the fabric 516' is apt to remain in the position shown in broken lines, and thus create no external trim edge. It is noted that the process of terminating the end of the fabric within the mold to eliminate a trim edge may be implemented in any of the molding processes described herein. When molded in such a manner, the fabric trim line, for example, the edge 517, is not substantially visible anywhere on the finished carrier 528.

A fifth alternative embodiment of the present invention, shown in FIGS. 29–32, is generally identical to carriers and frames of the above-described embodiments, except that the frame includes a flexible component, preferably located along one or more boundaries of the frame. In the embodiments shown, the seat frame 626 includes a flexible component 627 also referred to as a lip, or "waterfall" in the front portion thereof. This lip is flexible and/or resilient, and can be bent downward in the direction shown in FIG. 30 and also return to the shape shown in FIG. 29.

Figure 31:
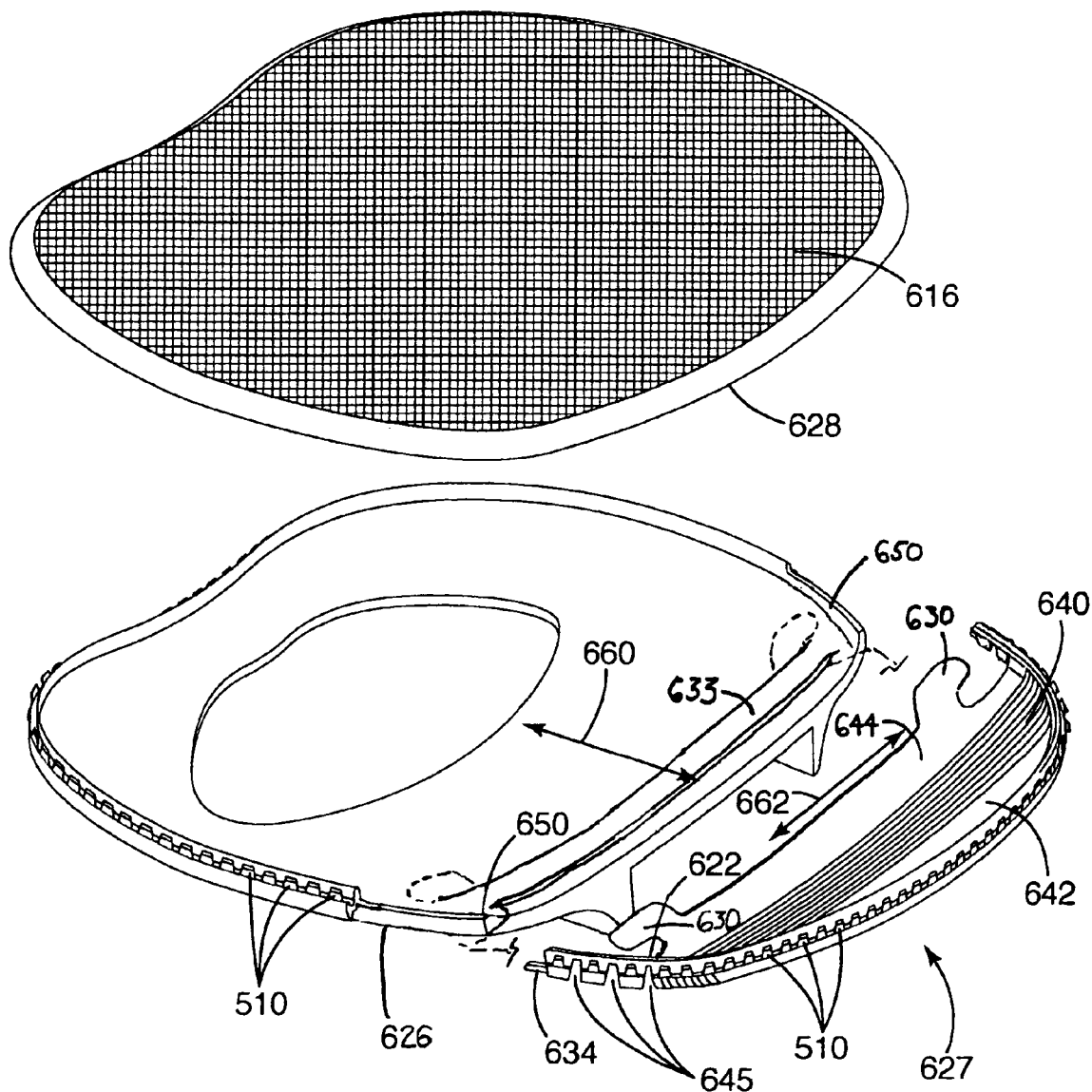
FIG. 31 is an exploded top perspective view of the carrier, frame and flexible component.
Figure 32:
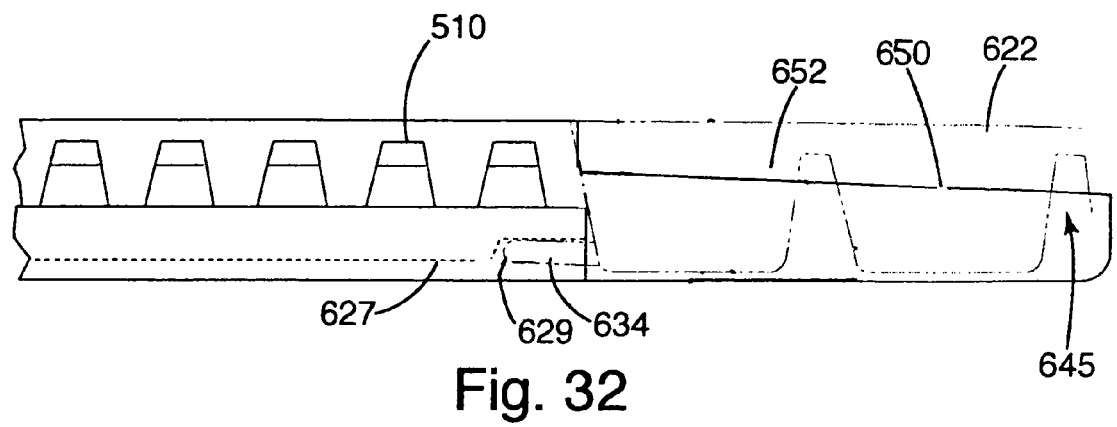
FIG. 32 is a side view of a mechanism that secures the flexile component to the frame.

The flexible component 627 shown in FIGS. 31–32 generally includes one or more indices 510 as described above so that the carrier 628, as also described above, and fabric 616 thereon can be expanded over the seat frame and/or the flexible component. These indices are positioned along a rim 622 of the flexible component that aligns with and/or provides continuity between indices on opposite sides of the frame 626.

Figure 29:
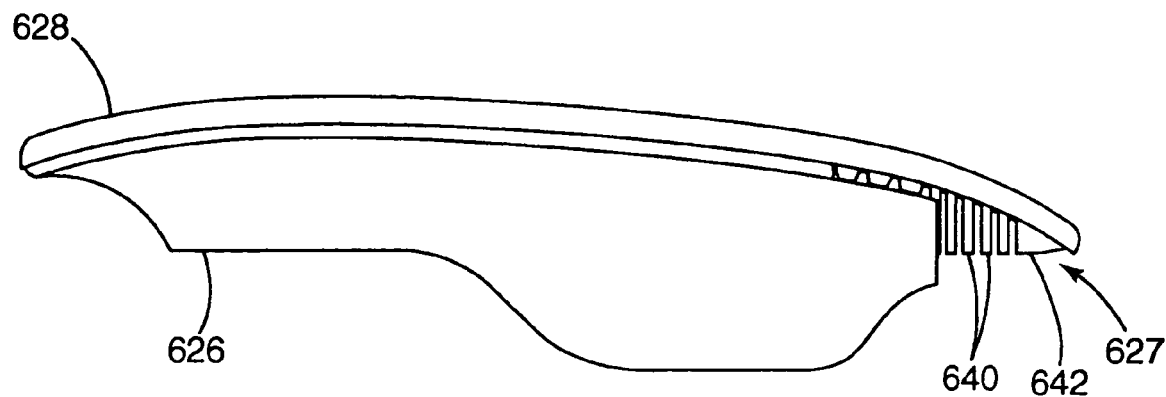
FIG. 29 is a side view of a first alternative flexible component in an un-flexed condition.
Figure 30:
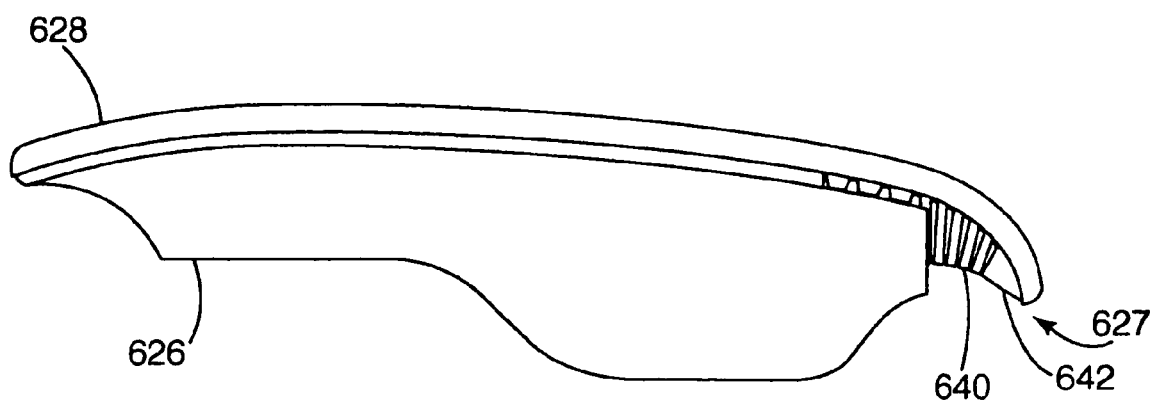
FIG. 30 is a side view of the flexible component in a flexed condition.

The flexible component 627 includes one or more lateral members 640 that extend across the component 627, preferably in parallel. These lateral members may be substituted with another structure, such as a flexible grid-like structure or other structure as desired to enable the flexible component 627 to flex as shown. The lateral members may be concave, convex or in any other orientation relative to the fabric 616 after the carrier and frame are joined. The ends of the members 640 terminate along the rim 622. The rim 622 of the flexible component may include channels or recesses 645 that enable the rim to flex and the flexible component to deflect downward and upward as desired. Optionally, a chair control (not shown) may be attached to the flexible component to hold the flexible component in a desired position, for example fully or partially flexed as shown in FIG. 30, or un-flexed, as shown in FIG. 29.

The flexible component 627 may include a reinforcement member 642 extending across the front edge of the component. As shown in FIG. 31, the member 642 include multiple indices 510. These indices may be identical to the indices on the seat frame 626 so that the carrier 628 and fabric 616 thereon can be expanded over both the seat frame and flexible component, as described in more detail below.

The flexible component may also include a heavy strut 644 extending between the rim on opposite sides of the flexible component. This strut may include ears 630 that fit under a secondary strut 633 included on the seat frame to further secure the flexible component 627 to the frame. This interfitment is shown in broken lines. Additional corresponding locking tabs and recesses may be included on the secondary strut 633 and/or heavy strut 644 to further secure the component 627 to the frame.

As shown in FIGS. 31 and 32, the flexible component also includes a portion of the rim 622 extending rearwardly, optionally beyond the lateral members 640. This portion includes a prong 634, which interlocks in the prong recess 629. The prong interfits in the prong recess 629 defined in the bottom of the seat track 627. Optionally, the recess 629 is of sufficient depth that the prong does not interfere with the primary and alignment rollers of the expanding machinery 300 described above when the carrier is attached to the frame and flexible component. Incidentally, the seat track 627 may also be defined in the flexible component as the application requires.

The prong and prong recess as shown act together with the ears to maintain the flexible component 627 in registration with the frame 626. Furthermore, a chair control (not shown) secured to the flexible component may also act to maintain the flexible component in registration with the seat frame.

Any one or more of these interlocking mechanisms may be deleted or substituted with another interlocking mechanism as desired.

The carrier 626 including the load bearing fabric 616 as described in any of the embodiments above may be secured to the frame 626 and flexible component 627 using any of the expanding machinery above. The indices 510 on the flexible component and frame may interlock with the indexing recess 550 of the carrier to expand the fabric 616 a desired amount in one or more pre-selected directions. In one embodiment, the carrier is joined with the frame and component so that the fabric is stretched in a way to maintain rigidity across the chair in direction 662, but to be somewhat flexible in direction 660 so that the flexible component 627 may flex as shown in FIG. 30. In effect, the flexible component 627 enables the portion of the fabric over or adjacent the flexible component to flex downwardly without significantly decreasing the side-to-side tension of the fabric in direction 662. This ability to retain side-to-side tension in the fabric while still maintaining downward flexibility near the flexible component may be improved by providing greater tension in the fabric in direction 662 than in direction 660. As explained above, this may be accomplished by simply stretching the fabric 616 on the carrier more across the frame than from front to back. Notably, the flexible front component 627 may be incorporated into a conventionally pre-stretched carrier as desired. In such an embodiment, the fabric 616 is pre-stretched to the desired tensions in the desired directions in a mold by a loom. The carrier is then molded in situ as described above, but with a portion of the carrier forming the flexible component 627. The finished carrier thus includes the flexible component molded therewith, and the fabric is pre-stretched on the carrier.

Figure 33:
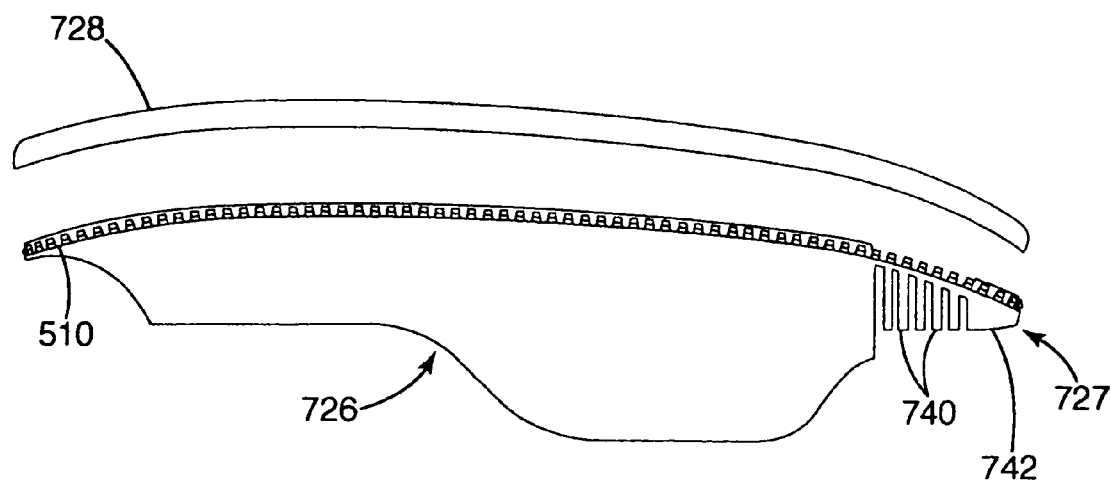
FIG. 33 is an exploded side view of a second alternative flexible component incorporated into the frame.

A sixth alternative embodiment of the present invention that includes a flexible component is illustrated in FIG. 33. The carrier 728, frame 726 and flexible component 727 are generally identical to the same components described above, except that the flexible component 727 and frame 726 are integrally formed as a single piece. Suffice it to say that the flexible portion includes the same features, for example, the lateral members 740, the front edge 742 and the indices 510 of the immediately above-described embodiment. However, because it is integrally molded to the frame 726, the mechanisms securing the flexible component 727 to the seat frame 726 as described above are absent. As with the above embodiments, this embodiment enables the flexible portion 727 of the seat frame to maintain rigidity in one direction across the seat but flex in the other direction downwardly so that the front edge flexes relative to the frame 726.

Figure 34:
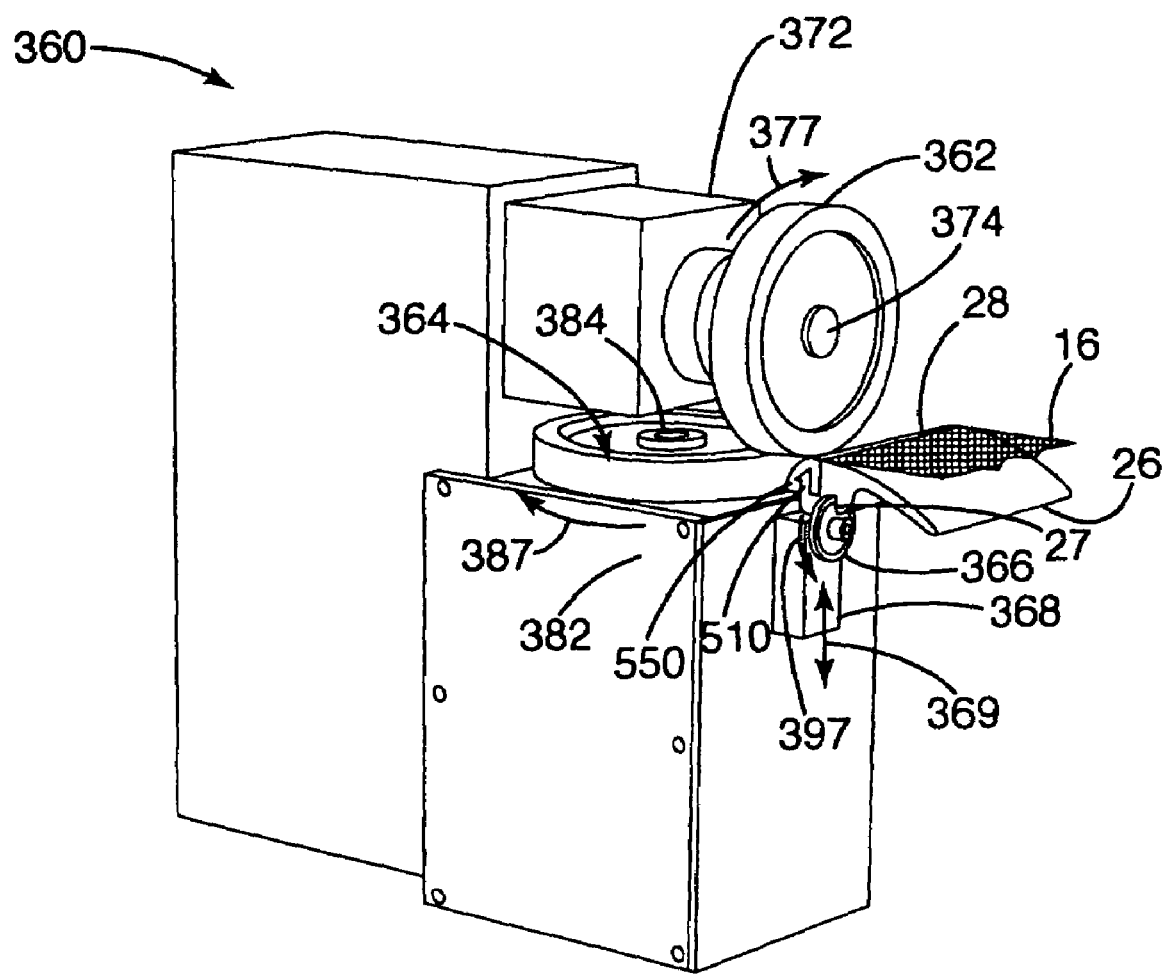
FIG. 34 shows a perspective view of an expanding machine.

A seventh alternative embodiment of the invention is directed to the expanding machinery 360 as shown in FIG. 34. This machinery joins the carrier 28 and frame 26 as described above, however, the individual rollers are slightly different. The expanding machinery 360 includes two drive wheels 362, 364, also referred to as rollers, a guide roller 366, and drive mechanisms for each of the wheels 362, 364, respectively. As shown, the first drive wheel 362 is rotatably mounted via axle 374 to housing 372, which preferably includes a conventional drive mechanism (not shown) to rotate the wheel 362. The second drive wheel 364 is rotatably mounted via axle 384 to the housing 382, which preferable includes another drive mechanism (not shown) to rotate the wheel 364. Optionally, the housings 372 and 382 may be one in the same, with the same drive mechanism rotating both wheels 362 and 364. Moreover, the two wheels are mounted on rotational axes that are angled with respect to one another. Although shown as being substantially perpendicular to one another, the wheels may be at any other angle as desired. Further, although not shown, one or both of the wheels may include contours that mate with the shape of the carrier 28 and/or frame 26.

A guide wheel 366, also referred to as a primary roller, is mounted opposing the first wheel 362. The primary roller shown rotates in a plane substantially parallel to the plane of rotation of the first wheel 362, however, other orientations may be used as desired. The primary roller 366 may or may not be driven. The primary roller 366 is mounted on a member 368 that is adapted to move in the directions 369 as shown, or mounted to a fixed member that does not move. A conventional drive mechanism (not shown) in the housing may effectuate the movement. Additional primary rollers may be added adjacent the roller 366 shown as desired.

In operation, the alternative expanding machinery 360 of FIG. 34 operates similarly to the machinery of the embodiments described above. To join a carrier 28 having a load bearing fabric 16 attached thereto to a frame 26, the frame and carrier are loaded into the machine within the space defined between the primary roller 366 and the drive wheel 362. To assist in this loading, the member 366 may move away from the wheel 362 in direction 368. In loading the components, the frame groove 27 is aligned with the primary roller 36. At this point, the indices 510 of the carrier and the index recesses 550 of the frame are generally separate from one another, however, one or the other or both are brought into contact with at least one of the two drive wheels 362, 364. The drive wheels 362 and 364 then rotate in directions 377 and 387 respectively. The contact between the wheels and the carrier or frame in turn advance the carrier and frame through the space defined between the wheels 362, 364 and the primary roller 366. The frame 26 and carrier 28 are fed through the wheels and primary roller about their entire peripheries to initially align the indices 510 and index recesses 550.

After alignment is complete, the carrier 28 and frame 26 may then be systematically joined by interlocking the indices and index recess of both. To join the components, the primary roller 366 is advanced toward the first wheel 362 with the carrier 28 and frame 26 disposed in the space there between. Accordingly, the indices are forced into the corresponding index recesses. In so doing, the fabric is stretched a predetermined amount as described above. Preferably, the expanding machine 360 advances the frame 26 and carrier 28 between the wheel 362 and primary roller 366 in incremental succession to join one portion of the carrier/frame and then the next adjacent portion to provide adequate tension in the fabric 16. As desired, the machine 360 may advance the frame 26 and carrier 28 in greater or lesser degrees depending on the amount of tension desired or the configuration of the components. Further as desired, the frame and carrier may be manually aligned or aligned by another machine (not shown) before introduction to the machinery 360 so that only a single pass is required to join the carrier and frame.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiment of the invention in which an exclusive property or privilege is claimed are defined as follows:

1. A method for attaching a carrier and load-bearing fabric assembly to a support structure comprising:
   providing a carrier and load-bearing fabric assembly, said assembly having a relaxed state and an expanded state, said assembly including a plurality of interlocking structures;
   providing a frame including a plurality of corresponding interlocking structures;
   engaging the carrier assembly with a drive roller to move the carrier assembly;
   engaging the frame at a plurality of points opposite the carrier assembly;
   pressing the carrier and frame toward one another between the drive roller and plurality of points; and
   joining the assembly and the frame so that said plurality of interlocking structures register with said plurality of corresponding interlocking structures to controllably expand the assembly from the relaxed state to the expanded state.

2. The method of claim 1 wherein at least one of the interlocking structures and said corresponding interlocking structures includes a taper, said taper configured to provide a predetermined amount of expansion of the assembly.

3. The method of claim 1 wherein the carrier of the assembly includes an expansion joint that cooperates with the plurality of interlocking structures and corresponding interlocking structures to provide a preselected amount of expansion of the carrier.

4. The method of claim 1 wherein the carrier of the assembly includes an expansion joint disposed between at least two adjacent interlocking structures of said plurality of interlocking structures.

5. The method of claim 1 wherein the carrier is molded from an elastic material and the joining step includes stretching the carrier to a preselected dimension.

6. The method of claim 3 wherein the expansion joint is an expansion recess defined in the carrier.

* * * * *